United States Patent
Nakayama et al.

(10) Patent No.: US 12,045,136 B2
(45) Date of Patent: Jul. 23, 2024

(54) INFORMATION PROCESSING APPARATUS, INFORMATION PROCESSING METHOD, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventors: Kota Nakayama, Kanagawa (JP); Kenji Matsukawa, Kanagawa (JP); Toru Hatori, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 159 days.

(21) Appl. No.: 17/699,158

(22) Filed: Mar. 20, 2022

(65) Prior Publication Data
US 2023/0062778 A1    Mar. 2, 2023

(30) Foreign Application Priority Data

Sep. 2, 2021  (JP) .................. 2021-143237

(51) Int. Cl.
*G06F 11/00* (2006.01)
*G06F 11/07* (2006.01)
*G06F 11/14* (2006.01)

(52) U.S. Cl.
CPC ...... *G06F 11/1443* (2013.01); *G06F 11/0709* (2013.01); *G06F 11/0793* (2013.01)

(58) Field of Classification Search
CPC ............. G06F 11/0709; G06F 11/1443; G06F 11/221; H04L 12/2803; H04L 12/2809; H04L 12/2838; H04L 2012/2843; H04L 2012/285; H04L 43/045; H04L 43/0817; H04L 43/16; H04L 67/125; H04L 41/0654; H04L 41/0806; H04L 41/083
See application file for complete search history.

(56) References Cited

U.S. PATENT DOCUMENTS

| | | | |
|---|---|---|---|
| 2007/0086261 A1 | 4/2007 | Freebern | |
| 2014/0181582 A1* | 6/2014 | Kujawa | G06F 11/1443 714/16 |
| 2018/0234313 A1* | 8/2018 | Cohen | H02J 13/00 |
| 2020/0106660 A1* | 4/2020 | Kakani | H04L 41/0645 |
| 2020/0174874 A1* | 6/2020 | Yamada | G06F 11/0778 |

FOREIGN PATENT DOCUMENTS

JP    2007115394    5/2007

* cited by examiner

*Primary Examiner* — Michael Maskulinski
(74) *Attorney, Agent, or Firm* — JCIPRNET

(57) ABSTRACT

An information processing apparatus includes a processor configured to, if a facility that is to be reserved for use is determined to have a fault in a communication function in view of a communication status with outside, perform a restore operation on the facility to restore the communication function.

17 Claims, 19 Drawing Sheets

INFORMATION PROCESSING APPARATUS, INFORMATION PROCESSING METHOD, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-143237 filed Sep. 2, 2021.

BACKGROUND

(i) Technical Field

The present disclosure relates to an information processing apparatus, an information processing method, information processing system, and non-transitory computer readable medium.

(ii) Related Art

Japanese Unexamined Patent Application Publication No. 2007-115394 discloses a technique of providing a specified automatic refresh mode that is used to perform a specified automatic refresh on a memory bank while other memory banks are active performing a read and write access.

There are some facilities that are to be reserved for use and equipped with a communication function to communicate with the outside. The facility includes a controller that controls a device in the facility in response to reservation information related to a reservation of the facility and obtained from the outside.

There is a possibility that the communication function fails to operate normally in the facility. If the communication function malfunctions, communication with the outside may be difficult and the controller may be unable to control a device in the facility in response to the reservation information. If such a problem occurs in the related art, an administrator performing maintenance of the facility goes to the target facility to restore the communication function of the facility. The restoration of the communication function is thus manually performed and thus there is room for improvements.

SUMMARY

Aspects of non-limiting embodiments of the present disclosure relate to starting an operation to restore a communication function without manual intervention if the communication function of a facility that is to be reserved for use malfunctions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, if a facility that is to be reserved for use is determined to have a fault in a communication function in view of a communication status with outside, perform a restore operation on the facility to restore the communication function.

BRIEF DESCRIPTION OF THE DRAWINGS

Exemplary embodiments of the present disclosure will be described in detail based on the following figures, wherein.

DETAILED DESCRIPTION

An information processing system 10 of exemplary embodiments is described below.

First Exemplary Embodiment

The information processing system 10 as a first exemplary embodiment of the disclosure is described below.

Figure 1:
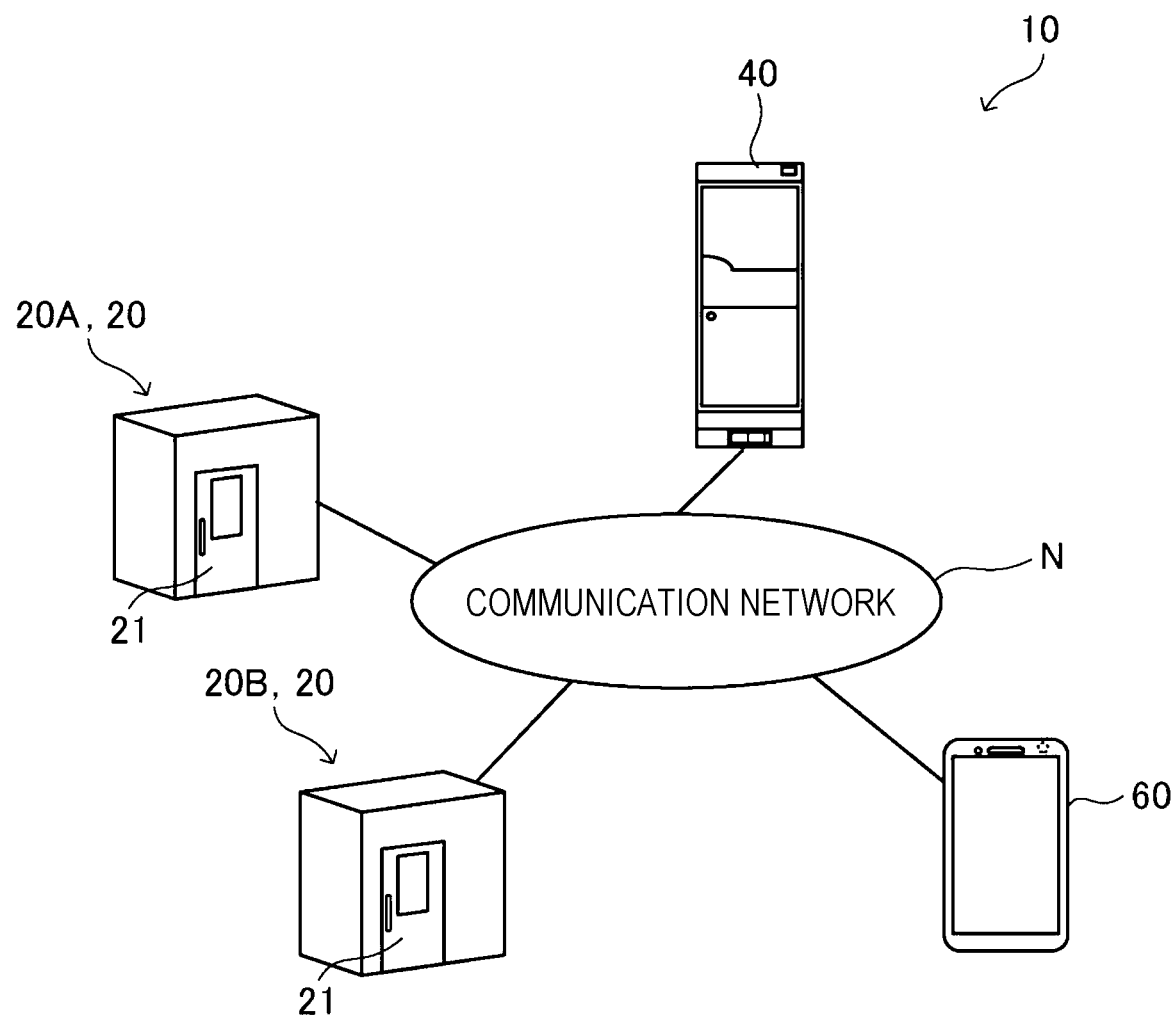
FIG. 1 illustrates a global configuration of an information processing system.

FIG. 1 illustrates a global configuration of the information processing system 10. Referring to FIG. 1, the information processing system 10 includes a work booth 20 including individual rooms 20A and 20B, management server 40, and user terminal 60. The work booth 20, management server 40, and user terminal 60 are connected to a communication network N. Communication is established between the work booth 20 and management server 40 and between the management server 40 and user terminal 60. The work booth 20 is an example of a "facility."

The work booth 20 may be installed, for example, near a station and may be private room space used for telework or study.

The management server 40 is a server computer performing operations for the work booth 20. For example, the management server 40 performs as the operations for the work booth 20 a reservation operation to reserve the work booth 20 and an unlocking operation to unlock a door 21 of the reserved work booth 20. The management server 40 is an example of a "server."

The user terminal 60 is held by a user who uses the work booth 20. The user terminal 60 may be a smart phone, tablet terminal, laptop, earphone-type bearable device that receives and/or outputs voice, or wearable terminal. The wearable terminal may be watch type, glasses type, wristband type, clip type, head-mounted display type, or strap type. According to the first exemplary embodiment, the user terminal 60 is of a smart-phone type. Multiple user terminals 60 may be used and include a smart phone, laptop, and other terminals.

Figure 2:
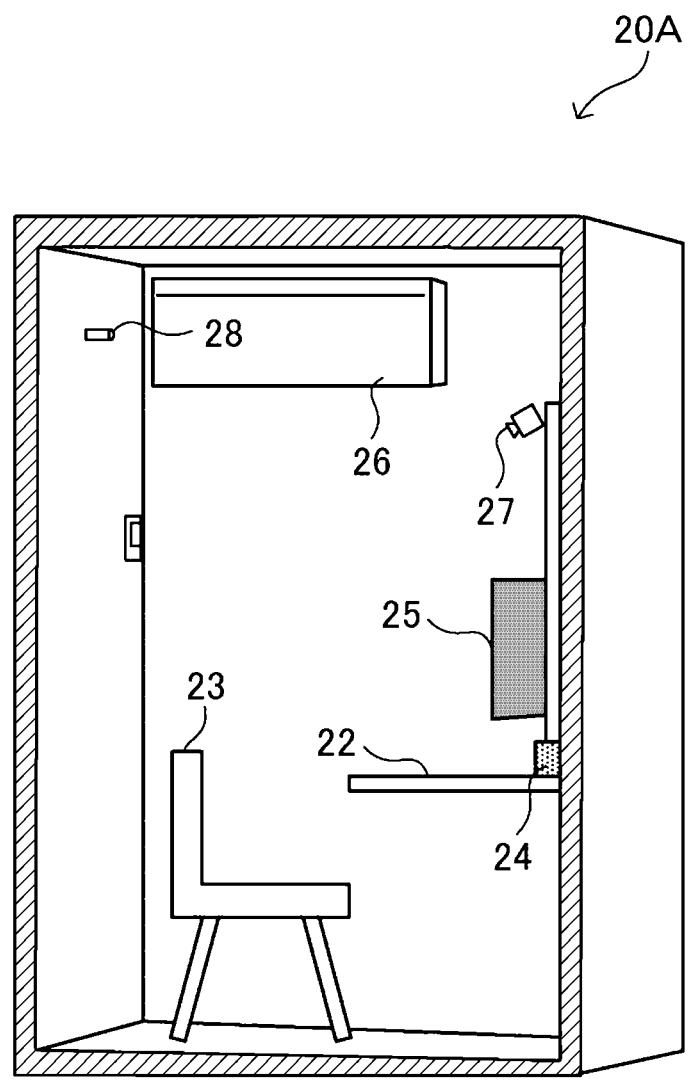
FIG. 2 illustrates an interior of a work booth.

The work booths 20 are identical to each other in configuration. The interior of the individual room 20A is thus representatively described. FIG. 2 illustrates the interior configuration of the individual room 20A. For example, the individual room 20A is configured to be applied for teleworking. Referring to FIG. 2, the individual room 20A includes a desk 22, chair 23, power outlet 24, display 25, air-conditioner 26, camera 27, and hook 28 as illustrated in FIG. 1. The door 21 is an example of a "door."

The door 21 of the individual room 20A includes an electronic lock that is locked or unlocked in response to an instruction from at least the management server 40. The electronic lock unlocks the door 21 when the individual room 20A receives an unlock instruction from the management server 40. The electronic lock locks the door 21 when the individual room 20A receives a lock instruction from the management server 40. The electronic lock locks or unlocks the door 21 when one of various switches 38 described below installed within the individual room 20A is operated. When the door 21 is locked or unlocked by the electronic lock, the individual room 20A transmits to the management server 40 contents of control performed.

Figure 3:
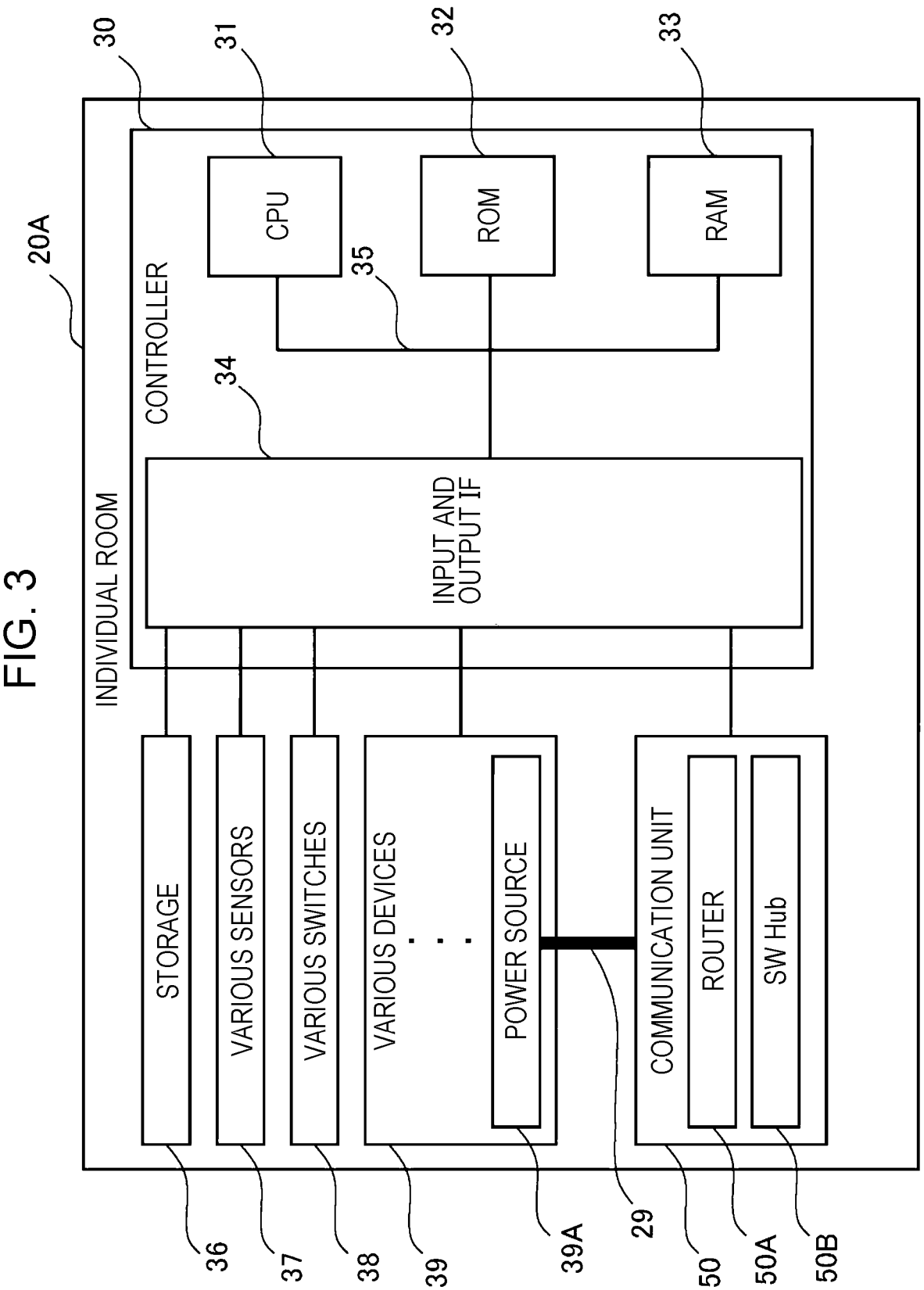
FIG. 3 is a block diagram illustrating an electrical configuration of the work booth.

FIG. 3 is a block diagram illustrating an electronic configuration of the individual room 20A. Referring to FIG. 3, the individual room 20A includes a controller 30 that controls the operation of the individual room 20A. For example, the controller 30 receives a variety of signals from the management server 40 and controls various devices 39 in response to the received various signals. For example, in the contents of the control, the controller 30 supplies or suspends power to the various devices 39 including the power outlet 24 and air conditioner 26.

The controller 30 includes a central processing unit (CPU) 31, read-only memory (ROM) 32, random-access memory (RAM) 33, input and output interface (IF) 34, and bus 35 that interconnects those elements. The controller 30 is an example of an "information processing apparatus."

The CPU 31 executes a variety of programs and controls the elements. The CPU 31 reads a program from the ROM 32 or a storage 36 described below and executes the program using the RAM 33 as a work area. In accordance with programs stored on the ROM 32 or the storage 36, the CPU 31 controls the elements and performs a variety of arithmetic operations. The CPU 31 is an example of each of a "processor" and a "first processor."

The ROM 32 stores a variety of programs and a variety of data. The RAM 33 serves as a work area and temporarily stores programs and data.

The input and output interface IF 34 serves as an interface for communications with the elements in the individual room 20A, including the storage 36, various sensors 37, various switches 38, various devices 39, and communication unit 50. Those elements communicate with the CPU 31 via the input and output interface IF 34.

The storage 36 includes a storage device, such as a hard disk drive (HDD), solid-state drive (SSD), or flash memory and stores a variety of programs and a variety of data. According to the first exemplary embodiment, the storage 36 stores at least an information processing program that performs a control process described below. The information processing program may be pre-installed on the controller 30 or may be appropriately installed by storing the information processing program on a non-volatile memory or delivering the information processing program via the communication network N. Examples of the non-volatile memory may include a compact disk read-only memory (CD-ROM), magneto-optical disk, HDD, digital versatile disk ROM (DVD-ROM), flash memory, or memory card.

The various sensors 37 are installed on the door 21 and within the individual room 20A to detect a variety of information. The information detected by the various sensors 37 is periodically transmitted to the management server 40. The various sensors 37 may include, for example, a human detecting sensor, temperature/humidity sensor, air-conditioner sensor, magnetic sensor, and excitation sensor. The various sensors 37 may include another sensor in addition to the sensors described above or may not necessarily include all the sensors described above.

According to the first exemplary embodiment, the opening and closing operation of the door 21 and the presence or absence of a human within the individual room 20A may be detected by the various sensors 37. The method of detecting the presence or absence of the human via the human detecting sensor is not limited to any particular method. The presence or absence of the human may be detected in response to the motion of an object within the individual room 20A using an infrared sensor, temperature sensor, optical sensor, and/or sound sensor.

The various switches 38 are installed within the individual room 20A. For example, the various switches 38 include a light switch that turns on or off lights in the individual room 20A and a door switch that locks or unlock the door 21. The various switches 38 may include another switch in addition to the switches described above or may not necessarily include all the switches described above.

The various devices 39 are installed within the individual room 20A. For example, the various devices 39 include a room lamp indicating whether a user is present or not in the individual room 20A, electronic lock, emergency button, power outlet 24, display 25, air-conditioner 26, camera 27, lights, ventilation fan, speaker, and power source 39A. The power source 39A is connected to the communication unit 50 via a power harness 29. The various devices 39 may include another device in addition to the devices described above or may not necessarily include all the devices described above.

The communication unit 50 is an interface used to communicate with another device. For example, the communication unit 50 includes a router 50A and a switching hub (SW Hub) 50B. The communication unit 50 may comply with standards for wired communication, such as Ethernet (registered trademark) or Fiber Distributed Data Interface (FDDI), or may comply with standards for wireless communication, such as the fourth generation communications system (4G), the fifth generation communications system (5G), or Wi-Fi (registered trademark). In other words, the communication function that the work booth 20 including the individual room 20A and individual room 20B uses to communicate with the management server 40 may be a wired communication function or a wireless communication function.

Figure 4:
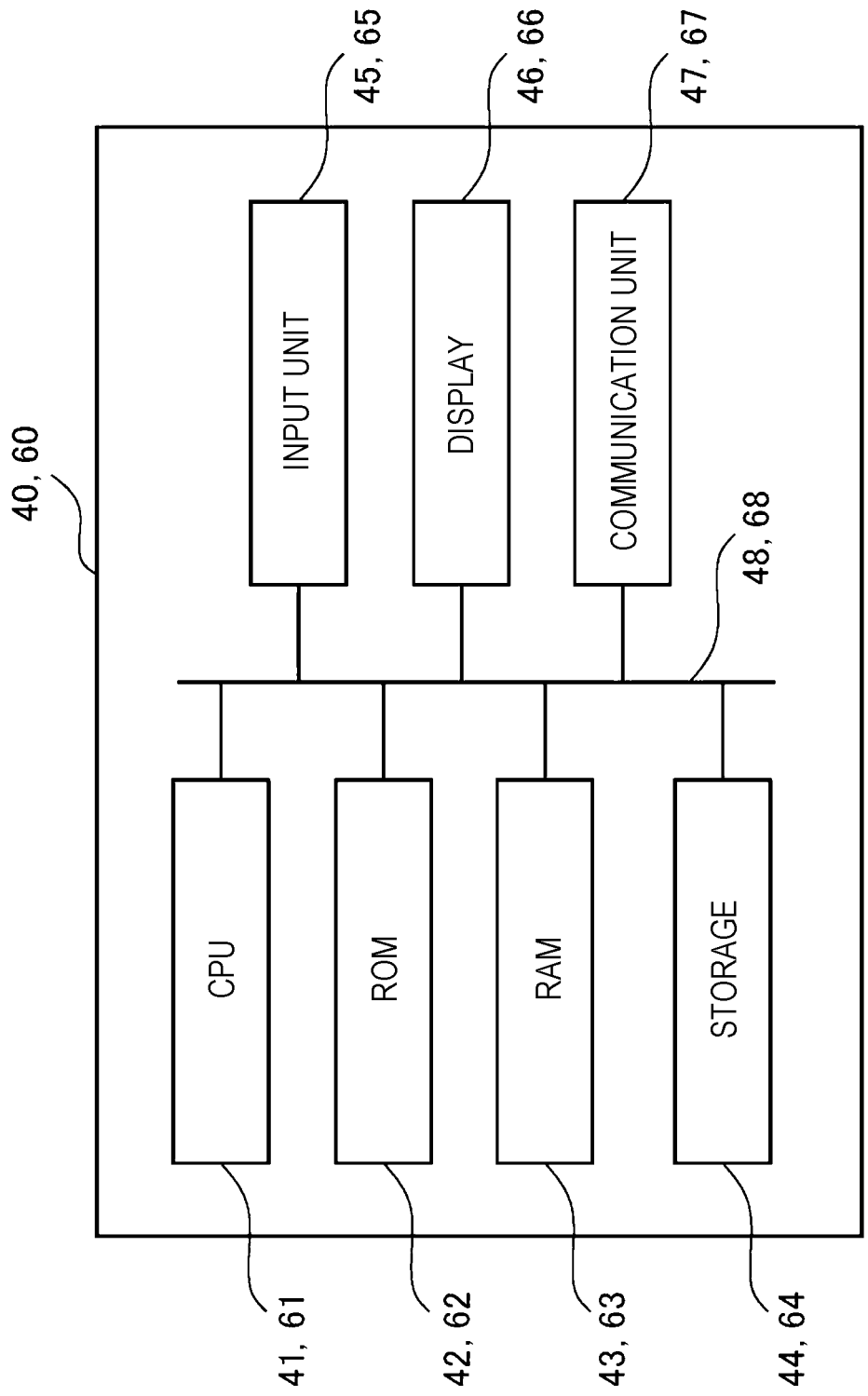
FIG. 4 is a block diagram illustrating a hardware configuration of each of a management server and user terminal.

FIG. 4 is a block diagram illustrating a hardware configuration of each of the management server 40 and user terminal 60. Each of the management server 40 and user terminal 60 has a typical computer configuration and the management server 40 is thus representatively described. The management server 40 communicates with the controller 30 via the communication function of the work booth 20 including the controller 30.

Referring to FIG. 4, the management server 40 includes a CPU 41, ROM 42, RAM 43, storage 44, input unit 45, display 46, and communication unit 47. Those elements are interconnected to each other via a bus 48 for communications.

The CPU 41 executes a variety of programs and controls the elements. Specifically, the CPU 41 reads a program from the ROM 42 or storage 44 and executes the program using the RAM 43 as a work area. In accordance with the program stored on the ROM 42 or storage 44, the CPU 41 controls the elements and performs a variety of arithmetic operations. The CPU 41 is an example of a "second processor."

The ROM 42 stores a variety of programs and a variety of data. The RAM 43 serves as a work area and temporarily stores programs and data.

The storage 44 is a recording medium, such as a HDD, SSD, or flash memory and stores a variety of programs and a variety of data.

The input unit 45 includes, for example, a pointing device, such as a mouse, a variety of buttons, keyboard, microphone, and camera, and is used to enter a variety of input signals.

The display 46 is, for example, a liquid-crystal display and displays a variety of information. The display 46 may be a touch panel, thus serving as the input unit 45.

The communication unit 47 is an interface used to communicate with another device. The communication unit 47 may comply with standards for wired communication, such as Ethernet or FDDI, or may comply with standards for wireless communication, such as 4G, 5G, or Wi-Fi.

In order to use the work booth 20, the user reserves the work booth 20 via a dedicated web site using the user terminal 60. The management server 40 performs a reservation operation to use the work booth 20. In conjunction with or in substitution of the web site, a dedicated application may be set up and an operation related to the work booth 20, such as a reservation operation with the management server 40, may be performed in response to an instruction from the dedicated application.

Figure 5:
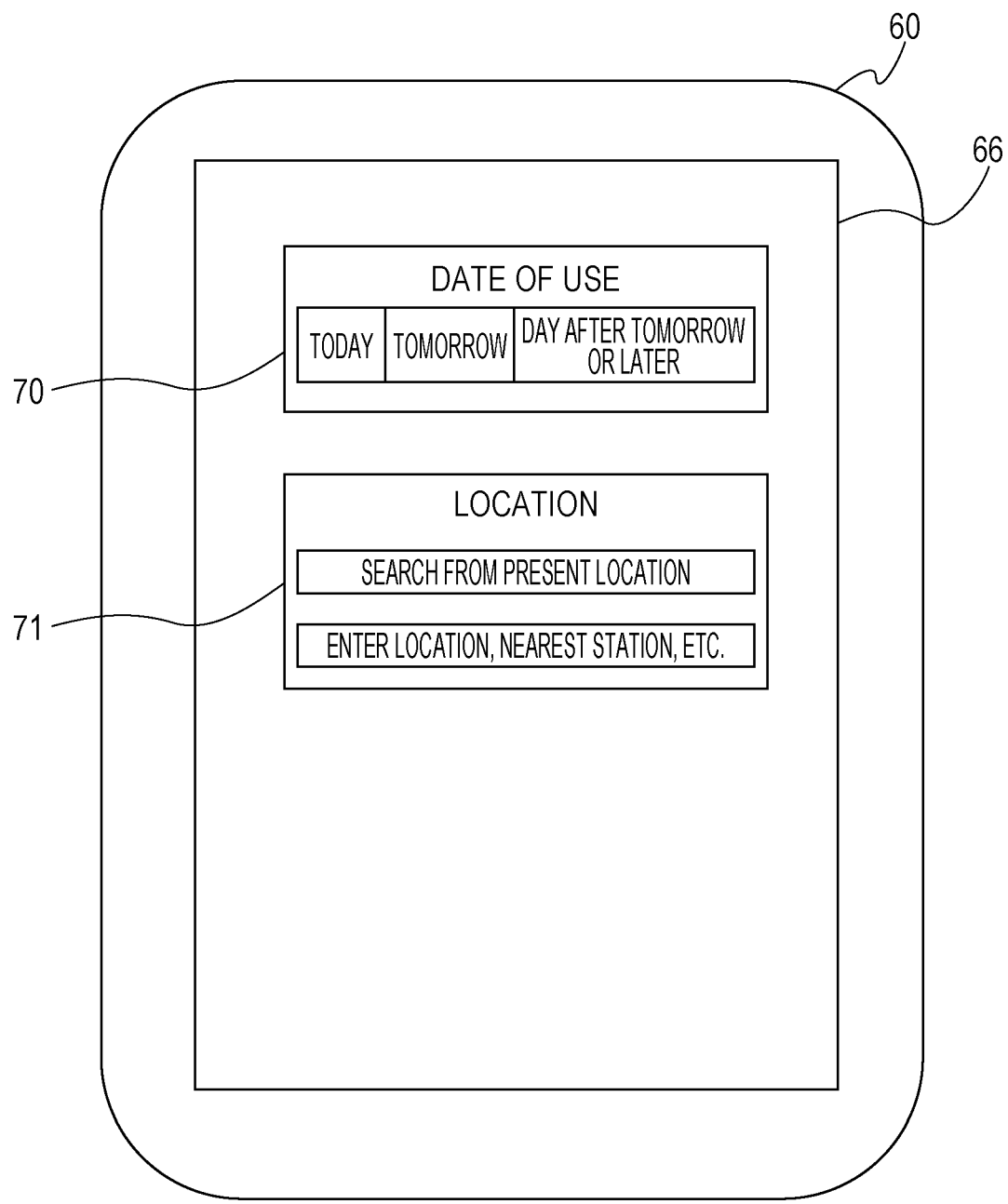
FIG. 5 illustrates a first display example of a reservation operation.

A display example of the reservation operation of the work booth 20 is described below. FIG. 5 illustrates a first display example of the reservation operation. After the user logs in on the web site, the CPU 41 in the management server 40 causes a display 66 in the user terminal 60 to display the first display example in FIG. 5 when an instruction to start the reservation operation is received.

The display 66 in FIG. 5 displays a date of use region 70 and location input region 71.

The date of use region 70 receives the date of use on which the user wants to use the work booth 20. For example, referring to FIG. 5, the date of use region 70 displays three items, namely, "Today," "Tomorrow," and "Day after tomorrow or later." If "Today" or "Tomorrow" is selected, the day of the reservation operation or the next day is entered as the day of use. If "Day after tomorrow or later" is selected, a calendar may be displayed and the user may be allowed to select the day after tomorrow or a later day with respect to the day of the reservation operation. The selected day on the calendar is entered as the day of use.

The location input region 71 is used to enter a location of the work booth 20 the user wants to use. Referring to FIG. 5, for example, the location input region 71 displays two items, namely, "Search from present location" and "Enter location, nearest station, etc." If "Search from current location" is selected, the work booth 20 located within a predetermined distance from the present location of the user terminal 60 (for example, within 1 km) is displayed as candidate information 72 (see FIG. 6). If "Enter location, nearest station, etc." is selected, the user is caused to enter a search keyword, such as a location name or the nearest station. The work booth 20 located within a predetermined distance (for example, within 1 km) from the location determined by the input search keyword is displayed as the candidate information 72 (see FIG. 6).

Figure 6:
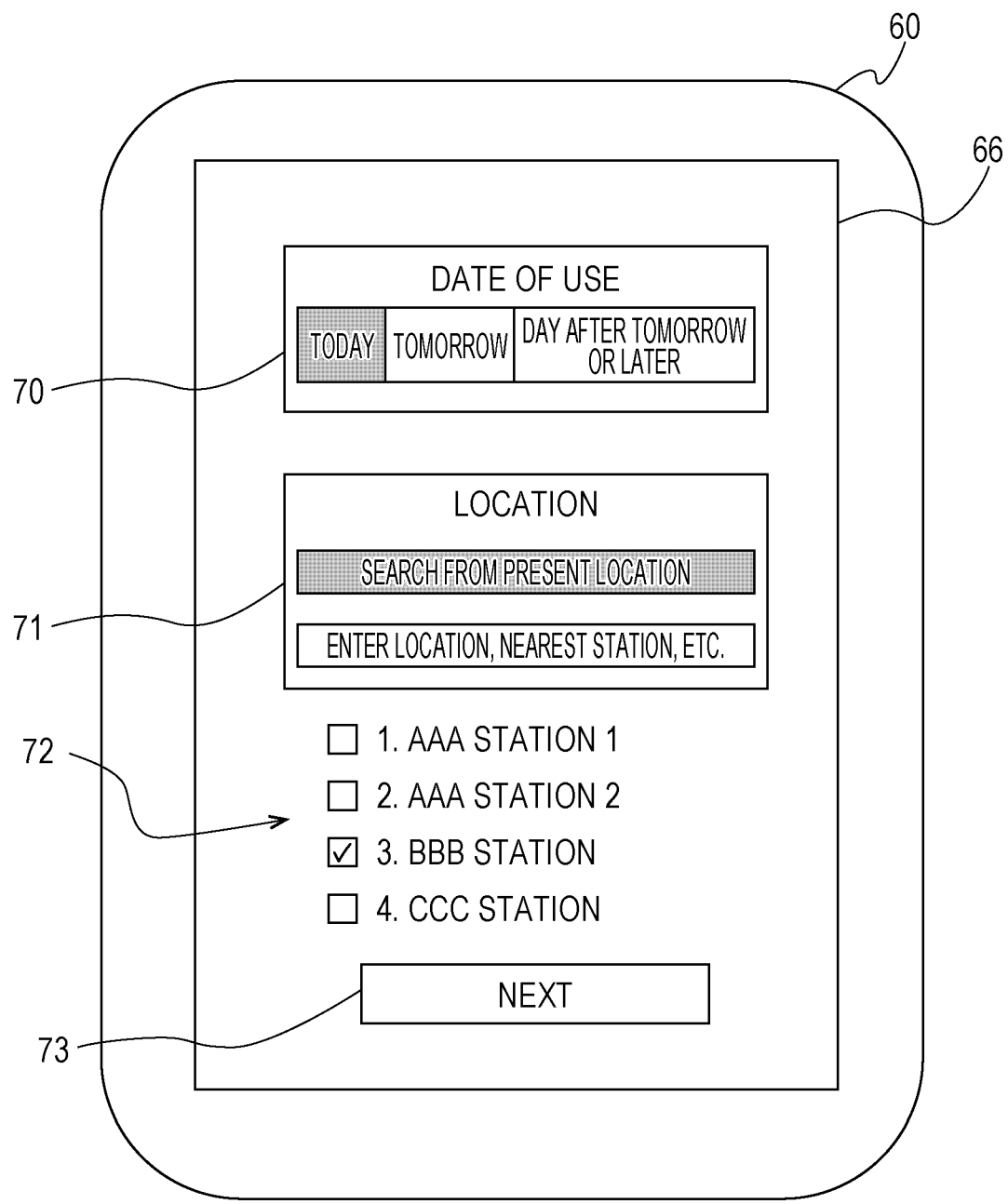
FIG. 6 illustrates a second display example of the reservation operation.

FIG. 6 illustrates a second display example of the reservation operation. When information is entered to each of the date of use region 70 and location input region 71, the CPU 41 switches from the display example in FIG. 5 to the display example on the display 66 in FIG. 6. As illustrated in FIG. 6, "Today" is selected in the date of use region 70 and "Search from present location" is selected in the location input region 71.

In the display example in FIG. 6, the candidate information 72 and next button 73 are displayed in addition to the display example in FIG. 5. The candidate information 72 includes multiple candidates and check boxes that allow a specific candidate to be selected from the candidates. For example, as illustrated in FIG. 6, the candidate information 72 displays multiple candidates of the work booth 20 responsive to the information entered to the date of use region 70 and location input region 71. Referring to FIG. 6, the check box for "3. BBB station" is checked from the multiple candidates of the work booth 20.

Figure 7:
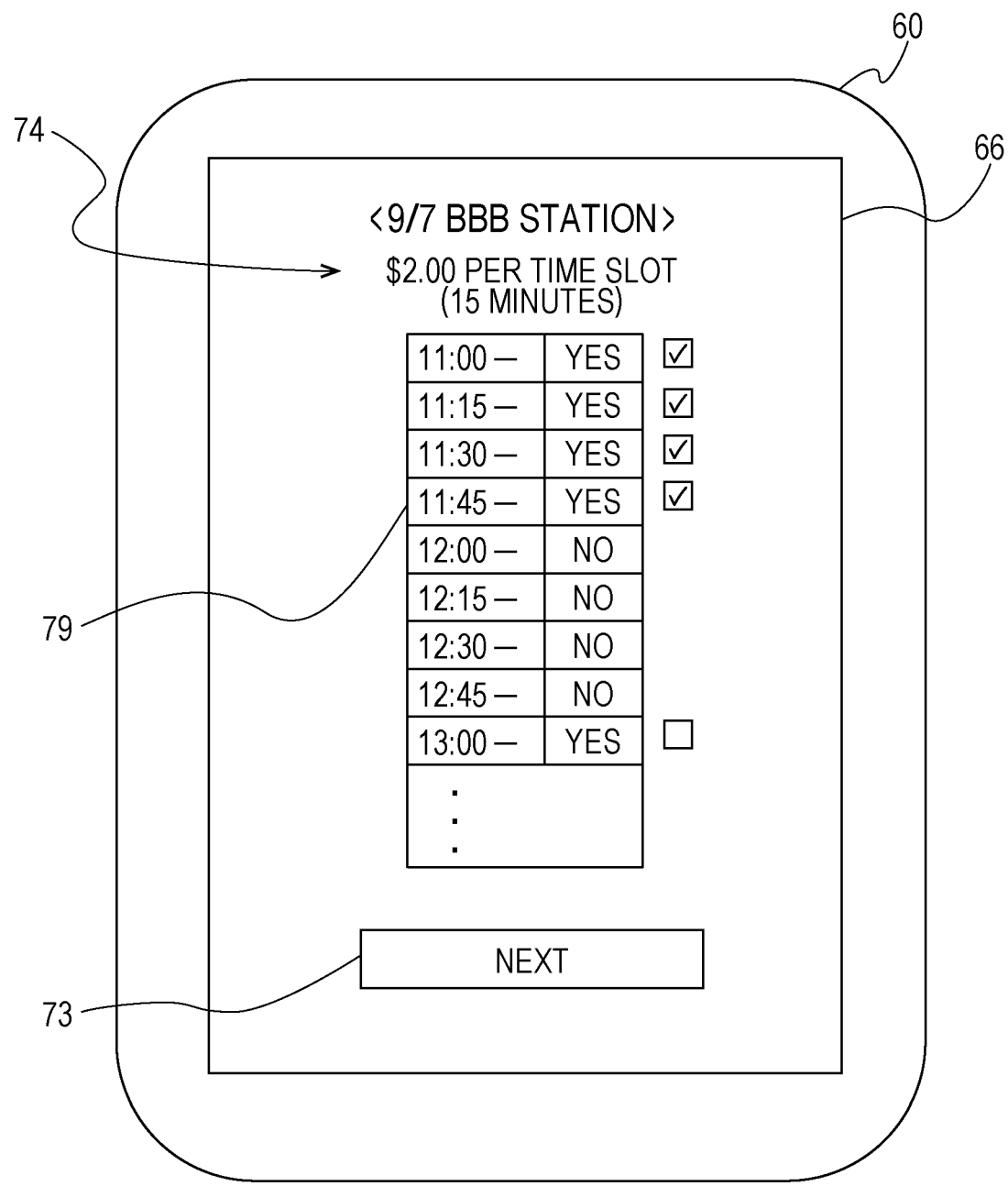
FIG. 7 illustrates a third display example of the reservation operation.

If the next button 73 is operated after one or more check boxes for the candidates of the work booths 20 displayed as the candidate information 72 are checked, the CPU 41 switches the contents displayed on the display 66 to the display example in FIG. 7.

FIG. 7 illustrates a third display example of the reservation operation. The display 66 in FIG. 7 displays message information 74, time band information 75, and next button 73.

The message information 74 displays a variety of messages to the user. For example, FIG. 7 illustrates "<9/7 BBB station>$2.00 per slot (15 minutes)" as the message information 74.

The time band information 75 includes a time band while the work booth 20 selected as the specific candidate is available and a time band while the work booth 20 is reservable. For example, referring to FIG. 7, the time band information 75 indicates the reservation status of each of the time bands of the work booth 20 that is available and corresponds to 1 slot (15 minutes). The reservation status of each slot is represented by "yes" or "no." If the reservation status is yes, the corresponding slot is reservable and if the reservation status is no, the corresponding slot is unreservable.

Referring to FIG. 7, check boxes are displayed to the right of reservable time bands and may be checked. One of more check boxes may be checked. The word "unreservable" signifies that the corresponding time band has passed or has already been reserved. According to the first exemplary embodiment, the reservable time band of the work booth 20 is thus displayed by displaying "yes" or "no" as the reservation status. The time band information 75 may indicate "no" before or after consecutively reserved slots.

Figure 8:
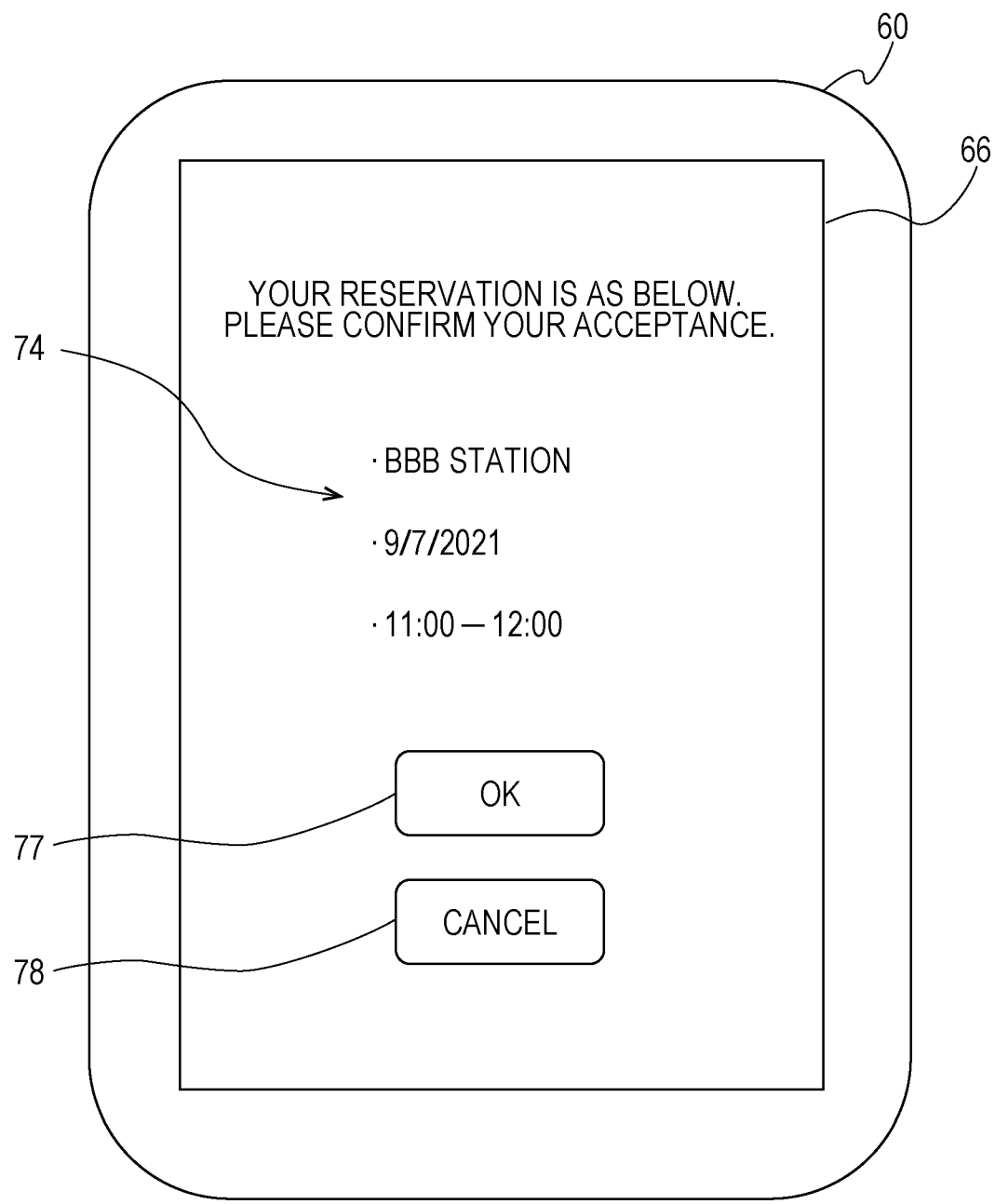
FIG. 8 illustrates a fourth display example of the reservation operation.

If one or more check boxes are checked from among the time band candidates reservable and displayed as the time band information 75, followed by the operation of the next button 73, the CPU 41 switches contents displayed on the display 66 to a display example in FIG. 8. The CPU 41 has now accepted the designation of four slots as the time bands, namely, "11:00-," "11:15-," "11:30-," and "11:45-" from the slots denoted by yes in the time band information 75.

Since only a single work booth 20 is present near the BBB station in the display example of FIG. 7, the reservation statuses represented by "yes" or "no" is displayed by a single column. However, if multiple booths, for example, three work booths 20 are present around the BBB station, the reservation statuses represented by "yes" or "no" for the three work booths 20 are displayed by three columns.

FIG. 8 illustrates a fourth display example of the reservation operation. The display 66 in FIG. 8 displays the message information 74, OK button 77, and cancel button 78. Referring to FIG. 8, the message information 74 is "Your reservation is as below. Please confirm your acceptance. BBB station 9/7/2021 11:00-12:00." If the OK button 77 is operated with the display example in FIG. 8 displayed, the CPU 41 completes the reservation of the work booth 20 with the contents of the message information 74 in FIG. 8. On the other hand, if the user operates the cancel button 78 with the display example in FIG. 8 displayed, the CPU 41 cancels the reservation of the work booth 20 and switches the contents of the display 66 to predetermined display contents.

If the work booth 20 is reserved with the reservation operation completed, the CPU 41 causes the storage 44 to store reservation information on the reservation. For example, the reservation information includes usage time while the work booth 20 is available to the user, reservation availability of the work booth 20, identification information uniquely identifying each reservation, reservation date, reserved location and reserved time band, name of the user, and contact address of the user. In this way, the storage 44 stores information indicating the user and the booth to be used by the user as the reservation information on each work booth 20.

The display example of the user terminal 60 of the user who has reserved the work booth 20 is described below.

Figure 9:
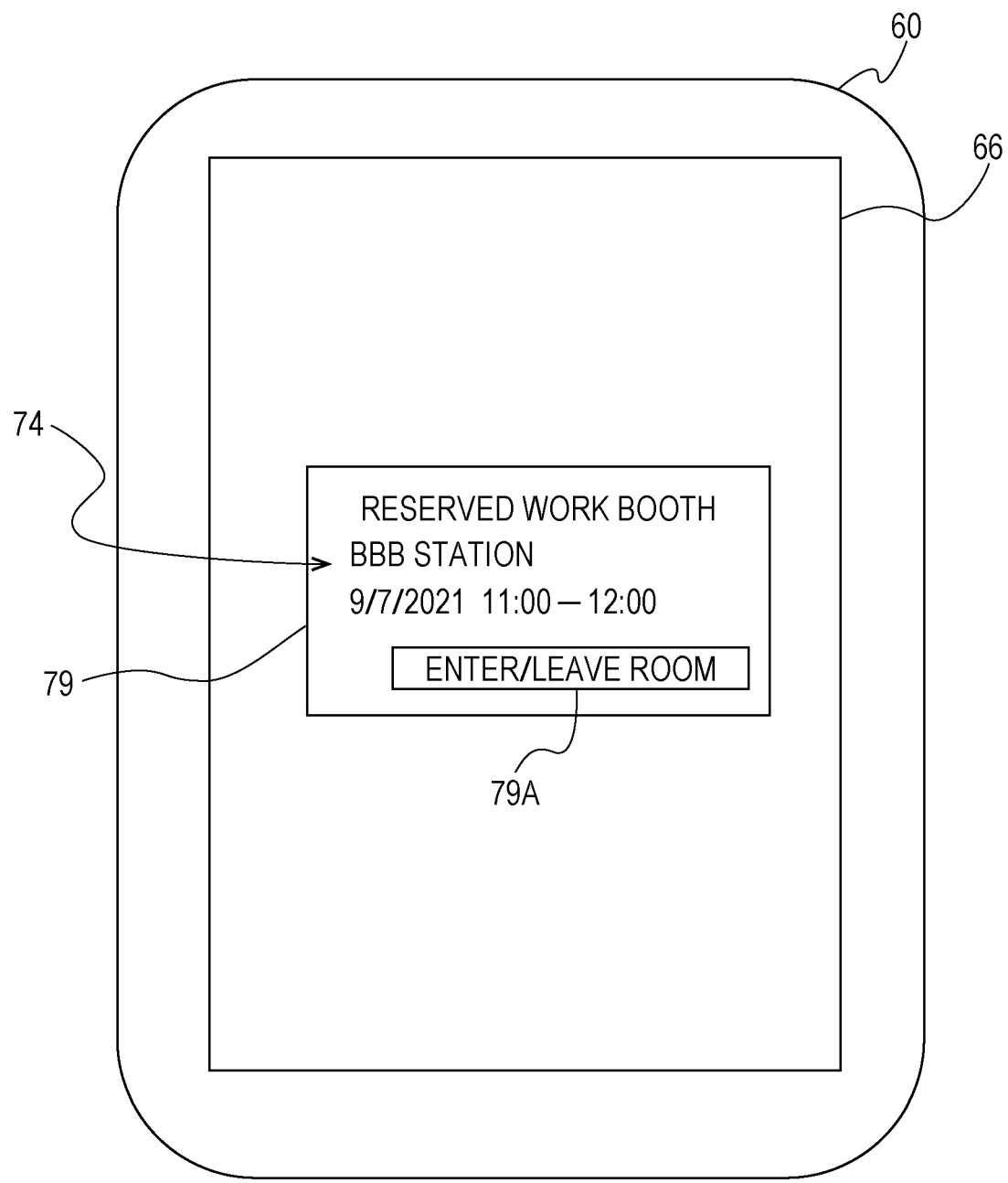
FIG. 9 illustrates a display example indicating a work booth that is reserved.

FIG. 9 illustrates a display example of the reserved work booth 20. When an instruction to cause a reserved work booth 20 to be displayed is received after the user logs in on the web site, the CPU 41 causes the display 66 to display the display example in FIG. 9. According to the first exemplary embodiment, the display example in FIG. 9 is displayed on a top screen immediately after the user logs in on the web site.

The display 66 in FIG. 9 displays work booth information 79 indicating the reserved work booth 20. The work booth information 79 includes the message information 74 and enter/leave room button 79A.

Figure 10:
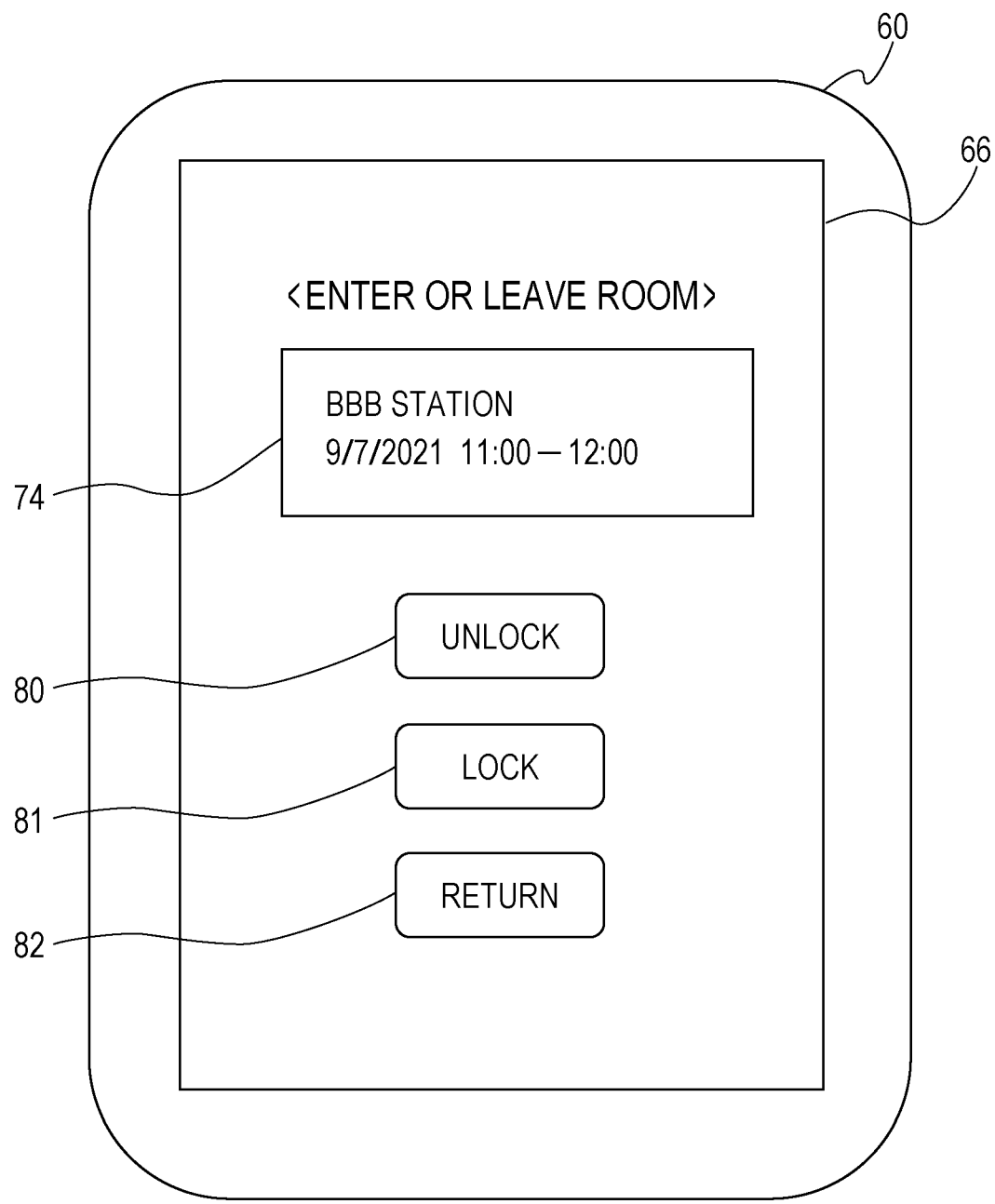
FIG. 10 illustrates a display example displayed after an enter/leave button is operated.

Referring to FIG. 9, the message information 74 is "Reserved work booth BBB station 9/7/2021 11:00-12:00." When the enter/leave room button 79A is operated by the user with the display example in FIG. 9 displayed, the CPU 41 switches the contents on the display 66 to display contents indicating an entry to or exit from the reserved work booth 20 (see FIG. 10).

FIG. 10 illustrates a display example that is displayed when the enter/leave room button 79A is operated. The display 66 in FIG. 10 displays the message information 74, unlock button 80, lock button 81, and return button 82.

FIG. 10 illustrates "BBB station 9/7/2021 11:00-12:00" as the message information 74.

The unlock button 80 is used to unlock the door 21 of the reserved work booth 20. According to the first exemplary embodiment, the unlock button 80 is operable during the time throughout which the reserved work booth 20 is capable of being unlocked, for example, the unlock button 80 is operable after the usage start time of the work booth 20. The CPU 41 causes the display 66 not to display the unlock button 80 until the work booth 20 becomes capable of being unlocked and thus causes the unlock button 80 to be inoperable. The disclosure is not limited to this method. Before the work booth 20 becomes capable of being unlocked, the CPU 41 may cause the display 66 to display the unlock button 80 but cause the door 21 not to be unlocked even when the unlock button 80 is operated.

When the user operates the unlock button 80 in the display example in FIG. 10, the user terminal 60 transmits to the management server 40 operation information indicating the operation of the unlock button 80. The CPU 41 in the management server 40 having received the operation information transmits an unlock instruction to the work booth 20. The CPU 31 in the controller 30 in the work booth 20 having received the unlock instruction controls an electronic lock, unlocking the door 21 of the work booth 20.

The lock button 81 may lock the door 21 of the reserved work booth 20. According to the first exemplary embodiment, the lock button 81 is operable when the door 21 of the reserved work booth 20 is capable of being locked, for example, when the door 21 of the work booth 20 is unlocked after the usage start time of the work booth 20.

When the user has operated the return button 82 with the display example in FIG. 10 displayed, the CPU 41 switches the contents on the display 66 to the display example in FIG. 9.

Figure 11:
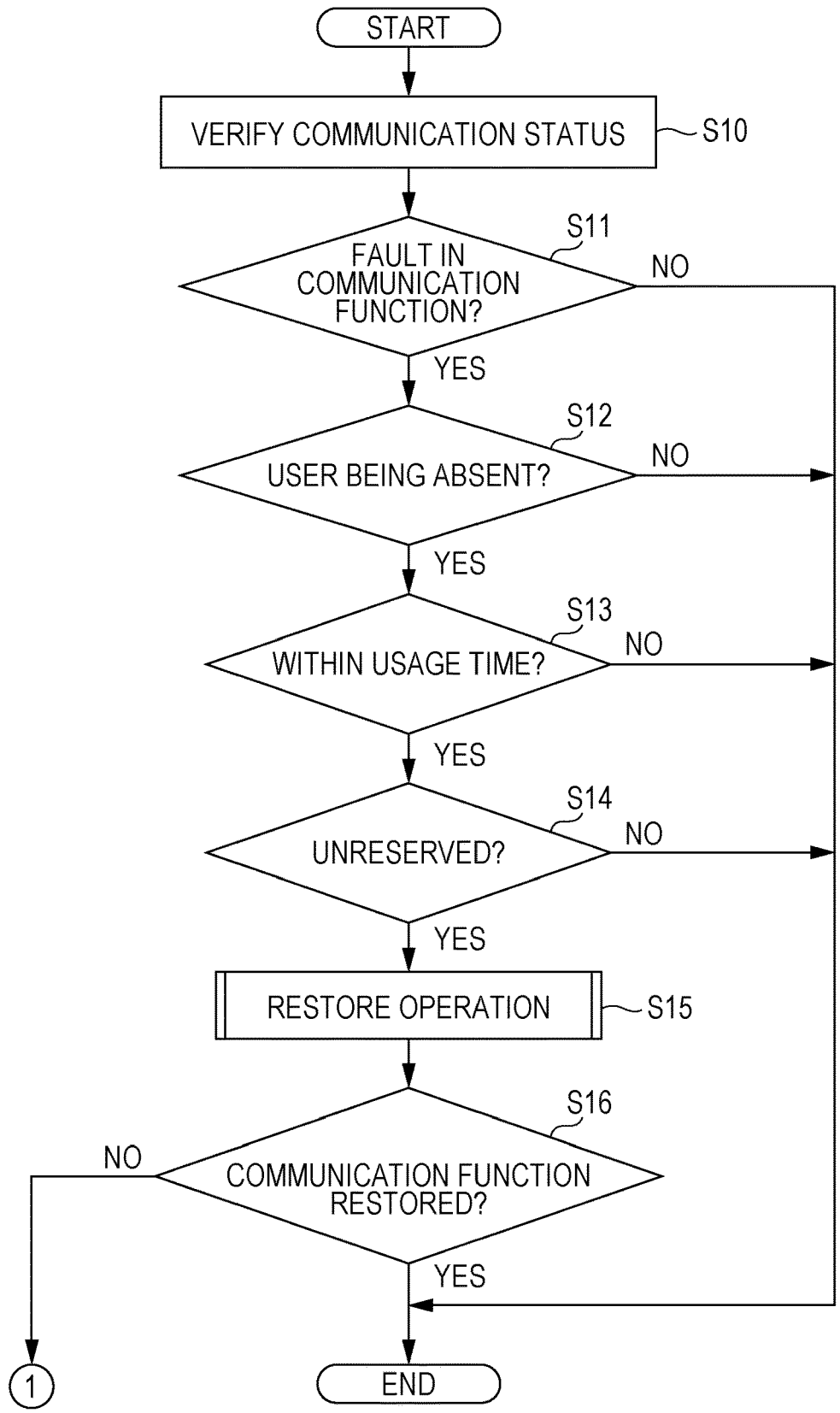
FIG. 11 is a first flowchart illustrating the flow of a control process performed by a controller in the work booth.
Figure 12:
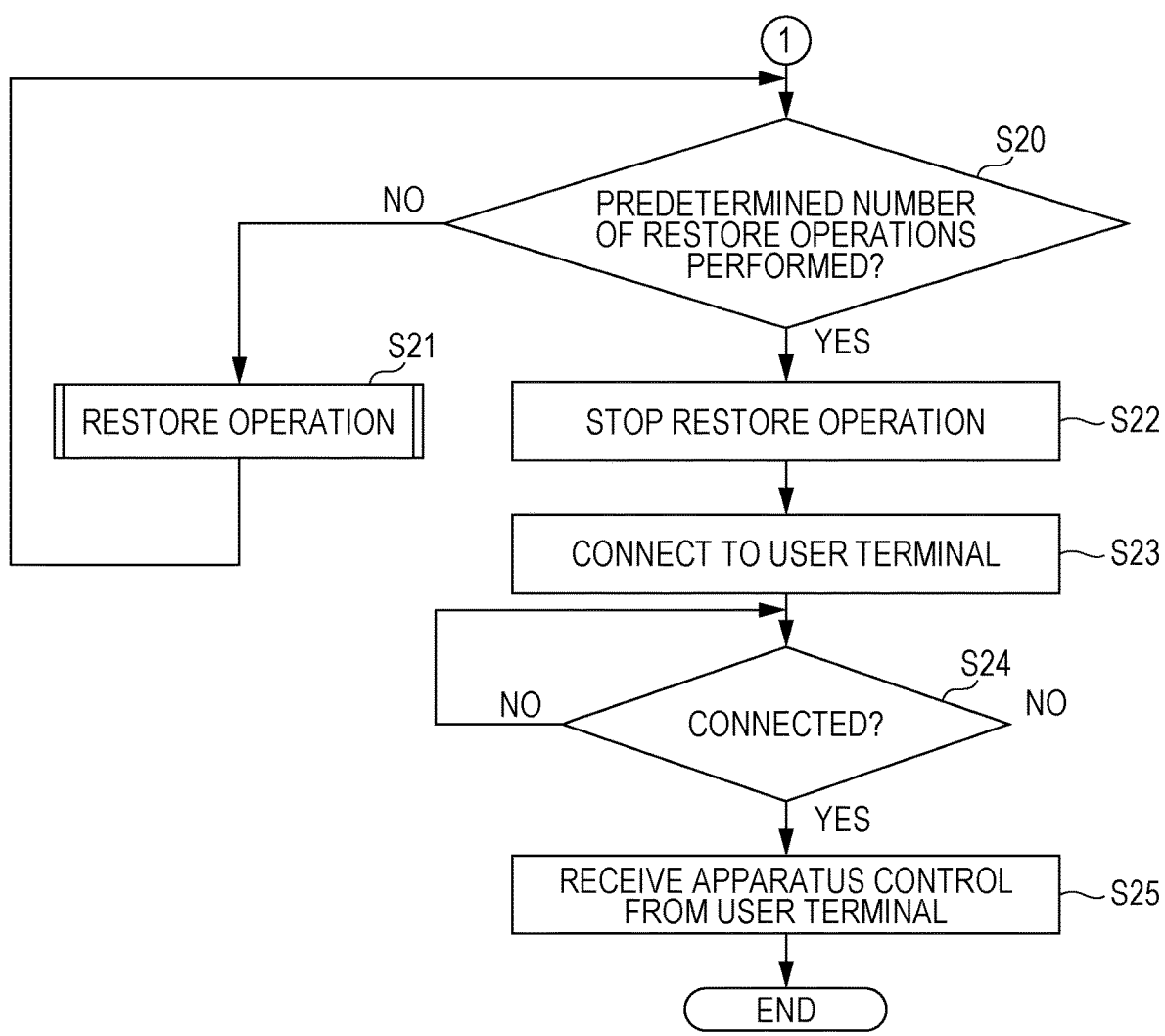
FIG. 12 is a second flowchart illustrating the flow of the control process performed by the controller in the work booth.
Figure 13:
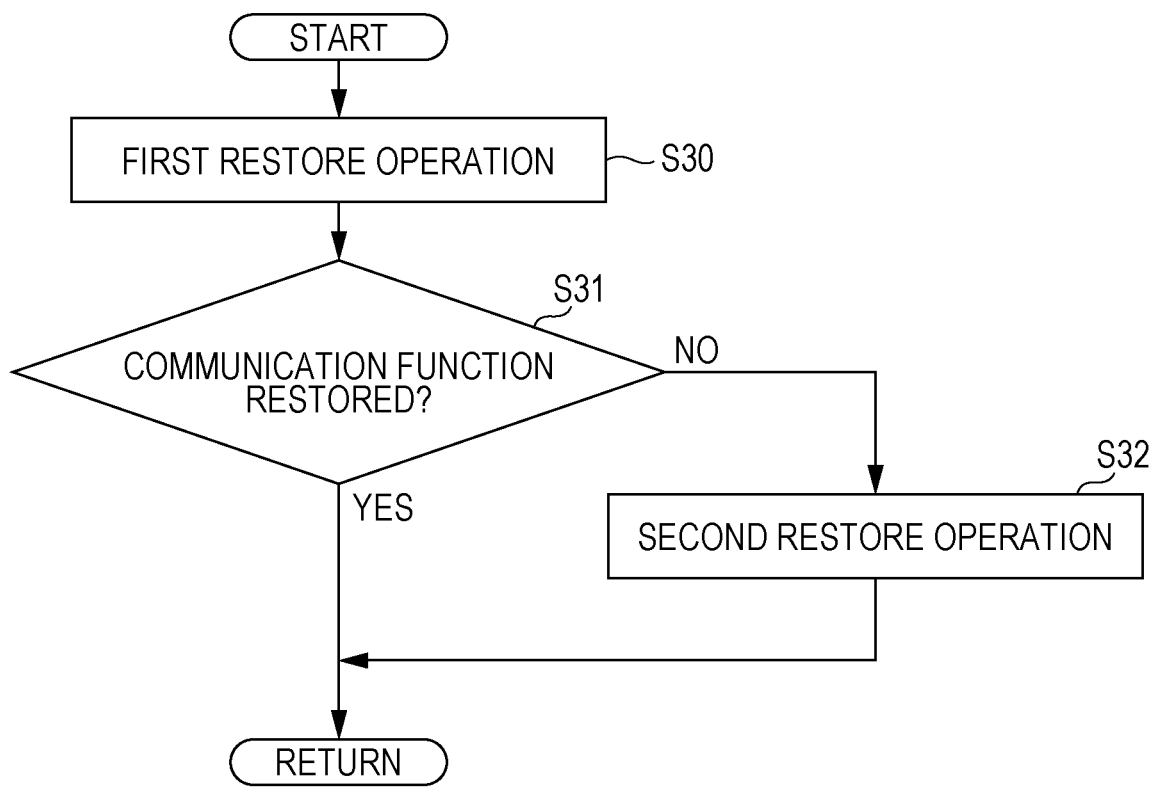
FIG. 13 is a flowchart illustrating a flow of a subroutine in each of step S15 in FIG. 11, step S21 in FIG. 12, step S41 in FIG. 14, and step S51 in FIG. 15.

FIGS. 11 through 13 are flowcharts illustrating the flow of a control process that the controller 30 in the work booth 20 performs in response to a communication status between the work booth 20 and the management server 40. The CPU 31 performs the control process by loading the information processing program from the storage 36 to the RAM 33 to execute the information processing program.

FIG. 11 illustrates a first flowchart indicating the flow of the control process. In step S10 in FIG. 11, the CPU 31 verifies the communication status between the work booth 20 and the management server 40. Processing proceeds to step S11. The communication status includes a transmission status of information transmitted from the work booth 20 to the management server 40 and a reception status of information received from the management server 40.

According to the first exemplary embodiment, the work booth 20 transmits periodically, for example, every 5 minutes, to the management server 40 detection information detected by the various sensors 37. For example, the transmission status of the detection information may include "transmission success" indicating that the transmission has been successfully completed and "transmission failure" indicating that the transmission has failed. According to the first exemplary embodiment, the management server 40 transmits periodically, for example, every 5 minutes, to the work booth 20 reservation information about the reservation of the work booth 20. The work booth 20 periodically receives the reservation information from the management server 40. The reception status of the reservation information includes "reception success" indicating that the reception has been successfully completed and "reception failure" indicating that the reception has failed.

In step S11, the CPU 31 determines whether the communication function of the work booth 20 has any fault. If the CPU 31 determines that the communication function has a fault (yes path in step S11), the CPU 31 proceeds to step S12. If the CPU 31 does not determine that the communication function has a fault (no path in step S11), the control process ends. The communication function is a function to communicate with the management server 40 and may be a wired communication function or a wireless communication function. In the discussion that follows, the communication function is the wireless communication function as an example.

The CPU 31 determines in step S11 that the communication function of the work booth 20 has the fault if the transmission status of the detection information indicates that the transmission failure has continued for a specific period of time, for example, 10 minutes or longer and/or if the reception status of the reservation information indicates that the reception failure has continued for a specific period of time, for example, 10 minutes or longer.

If the communication function of the work booth 20 has the fault, the user may have difficulty accessing an access point of Wi-Fi (registered trademark) or the management server 40 may have difficulty remotely controlling the various devices 39 in the work booth 20.

In step S12, the CPU 31 determines whether the user is absent within the work booth 20. If the CPU 31 determines that the user is absent within the work booth 20 (yes path in step S12), the control process proceeds to step S13. If the CPU 31 does not determine that the user is absent (no path in step S12), the control process ends. For example, the CPU 31 determines whether the user is present within the work booth 20, based on the detection results of the presence or absence of a person within the work booth 20 through a human detection sensor in the various sensors 37. The first exemplary embodiment is not limited to this method. In response to the image of the interior of the work booth 20 captured by the camera 27, the CPU 31 may determine the presence or absence of the user within the work booth 20.

In step S13, the CPU 31 determines whether time is within a usage time while the work booth 20 is available to the user. If the CPU 31 determines the time is within the usage time (yes path in step S13), the control process proceeds to step S14. If the CPU 31 does not determine that the time is within the usage time (no path in step S13), the control process ends. For example, if the time of the control process is within the usage time of the work booth 20 included in the reservation information received from the management server 40 immediately before, the CPU 31 determines in step S13 that the time is within the usage time.

In step S14, the CPU 31 determines whether the time of the control process is within an unreserved time band of the work booth 20 in the usage time. If the CPU 31 determines that the time of the control process is within an unreserved time band (yes path in step S14), the control process proceeds to step S15. If the CPU 31 does not determine that the time of the control process is within the unreserved time band (no path in step S14), the control process ends. For example, if the time of the control process is within a reservable time band of the work booth 20 in the reservation status of the reservation information received from the management server 40 immediately before, the CPU 31 determines in step S14 that the time of the control process is within the unreserved time band of the work booth 20.

In step S15, the CPU 31 performs on the work booth 20 a restore operation to restore the communication function of the work booth 20. The control process proceeds to step S16. A subroutine in step S15 is described below.

In step S16, the CPU 31 determines whether the communication function of the work booth 20 has been restored. If the CPU 31 determines that the communication function of the work booth 20 has been restored (yes path in step S16), the CPU 31 ends the control process. If the CPU 31 does not determine that the communication function of the work booth 20 has been restored (no path in step S16), the control process proceeds to step S20 in FIG. 12. If the cause of the fault of the communication function of the work booth 20 detected in step S11 has been removed, the CPU 31 determines in step S16 that the communication function of the work booth 20 has been restored. Specifically, the cause may be due to the transmission status of the detection information. When the transmission status shifts to the transmission success, the CPU 31 determines that the communication function of the work booth 20 has been restored. The cause may be due to the reception status of the reservation information. When the reception status shifts to the reception success, the CPU 31 determines that the communication function of the work booth 20 has been restored. The cause may be due to the transmission status of the detection information and the reception status of the reservation information. When the transmission status shifts to the transmission success and the reception status shifts to the reception success, the CPU 31 determines that the communication function of the work booth 20 has been restored.

FIG. 12 is a second flowchart of the flow of the control process. In step S20 in FIG. 12, the CPU 31 determines whether the predetermined number of restore operations have been performed. If the CPU 31 determines that the predetermined number of restore operations have been performed (yes path in step S20), the control process proceeds to step S22. If the CPU 31 does not determine that the predetermined number of restore operations have been performed (no path in step S20), the control process proceeds to step S21. According to the first exemplary embodiment, for example, the predetermined number is five. Alternatively, the predetermined number may be higher than or lower than five.

In step S21, the CPU 31 performs the restore operation on the work booth 20 and then returns to step S20. The subroutine performed in step S21 is described below.

In step S22, the CPU 31 stops the restore operation and then proceeds to step S23.

In step S23, the CPU 31 tries connecting to the user terminal 60 of the user who has reserved the work booth 20 via a predetermined connection method and then proceeds to step S24. According to the first exemplary embodiment, the predetermined connection method is Bluetooth (registered trademark). The predetermined connection method is not limited to Bluetooth. Any other method, such as infrared communication, may be used as long as connection with the user terminal 60 remains connectable even when communication function of the work booth 20 has a fault. In step S23, specifically, the CPU 31 transmits to the surroundings of the work booth 20 connection information used to communicate via Bluetooth with the work booth 20.

In step S24, the CPU 31 determines whether the connection has been established with the work booth 20 via the predetermined connection method, for example, Bluetooth. If the CPU 31 determines that the connection has been established with the work booth 20 via Bluetooth (yes path in step S24), the control process proceeds to step S25. If the CPU 31 does not determine that the connection has been established with the work booth 20 via Bluetooth (no path in step S24), the CPU 31 waits on standby until the Bluetooth connection has been established.

In step S25, the CPU 31 receives control over the various devices 39 from the user terminal 60. The control process thus ends. The various devices 39 receiving the control from the user terminal 60 may be all or some of the devices forming the various devices 39.

FIG. 13 is a flowchart illustrating the subroutine in step S15 in FIG. 11 and step S21 in FIG. 12.

In step S30, the CPU 31 performs as the restore operation a first restore operation that tries restoring the communication function of the work booth 20 by activating the communication unit 50 connected to the controller 30. The CPU 31 proceeds to step S31. The first restore operation includes performing control of power supplying to the power harness 29 with one end connected to the communication unit 50 and the other end connected to the power source 39A and re-starting the router 50A in the communication unit 50. The control of power supplying to the power harness 29 is re-starting supplying power to the power harness 29 after power supplying to the power harness 29 is interrupted for a constant period of time. The communication unit 50 is an example of a "communication device."

In step S31, if the CPU 31 determines whether the communication function of the work booth 20 has been restored. If the CPU 31 determines that the communication function has been restored (yes path in step S31), the control process proceeds to step S16 in FIG. 11 or returns to step S20 in FIG. 12. Specifically, if the subroutine is carried out in step S15 in FIG. 11, the control process proceeds to step S16. If the subroutine is carried out in step S21 in FIG. 12, the control process proceeds to step S20. On the other hand, if the CPU 31 does not determine that the communication function has been restored (no path in step S31), the control process proceeds to step S32. For example, if the cause of the fault determined to occur in the communication function of the work booth 20 in step S11 in FIG. 11 is removed, the CPU 31 determines in step S31 that the communication function of the work booth 20 has been restored.

In step S32, the CPU 31 performs as the restore operation a second restore operation that tries restoring the communication function of the work booth 20 by re-starting an operating system of the controller 30. The control process proceeds to step S16 in FIG. 11 or returns to step S20 in FIG. 12. Specifically, if the subroutine has been performed in step S15 in FIG. 11, the control process proceeds to step S16. If the subroutine has been performed in step S21 in FIG. 12, the control process returns to step S20. The examination performed by the inventor has revealed that when the communication function of the work booth 20 has a fault, the communication function is restored at a higher probability via the first restore operation than via the second restore operation.

In the related art, if the communication function of the work booth 20 has a fault, the administrator maintaining the work booth 20 goes to a target the work booth 20 to restore the communication function. Specifically, in the related art, the communication function of the work booth 20 is restored via manual intervention.

In contrast, according to the first exemplary embodiment, if the CPU 31 determines, in accordance with the communication status of the work booth 20 in communication with the management server 40, that the communication function of the work booth 20 has a fault, the CPU 31 performs the restore operation on the work booth 20. According to the first exemplary embodiment, if the communication function of the work booth 20 has the fault, an operation to restore the communication function without manual intervention, specifically, the restore operation may be performed. The management server 40 is an example of "outside." The example of the outside is not limited to the management server 40. The example of the outside may be any device as long as the device may communicate via the communication function of the work booth 20. For example, the example of the outside may be a terminal or other device, held by the administrator.

According to the first exemplary embodiment, the CPU 31 performs the restore operation if the CPU 31 determines that the work booth 20 has no user therewithin. In other words, if the CPU 31 does not determine that the work booth 20 has no user therewithin, the CPU 31 does not perform the restore operation. If the second restore operation has been performed as the restore operation, the entire system of the work booth 20 is closed and as a result, the operation of the lights, electronic lock, etc. is suspended. In this case, if a user working within the work booth 20 is present, the user may have difficulty continuing the user's job. According to the first exemplary embodiment configured described, influence of the restore operation on the user may be reduced in comparison with when the restore operation is performed when a user is present within the work booth 20.

According to the first exemplary embodiment, the CPU 31 performs the restore operation if the CPU 31 determines that the time is within the usage time while the work booth 20 is available to the user. The operating time of the work booth 20 on a day may be set to be longer than when the restore operation is performed after hours of use of the work booth 20 on that day.

According to the first exemplary embodiment, the restore operation is performed if the CPU 31 determines that the time is within an unreserved time band of the usage time of the work booth 20. As described above, when the second restore operation is performed, the whole system of the work booth 20 is closed, suspending the operation of the lights, electronic lock, etc. The user may have difficulty using the work booth 20 in the reserved time band. According to the first exemplary embodiment configured described above, influence of the restore operation on the user having reserved the work booth 20 may be may be reduced in comparison with when the restore operation is performed in a reserved time band of the work booth 20 within the usage time.

According to the first exemplary embodiment, the CPU 31 stops the restore operation if the communication function of the work booth 20 is not restored even with a predetermined number of restore operations performed. In the case of a physical connection error of the power harness 29, such as disconnection or half-disconnection of the power harness 29, the communication function is not restored even when the restore operation is consecutively tried. The restore operation may thus be stopped. According to the first exemplary embodiment, the workload on the CPU 31 may be lighter than when the restore operation is continued until the communication function is restored. In conjunction with or in substitution of performing the predetermined number of restore operations, the restore operation may be stopped if the communication function of the work booth 20 is not restored after the restore operation is repeated for a predetermined period of time, for example, 10 minutes. The predetermined period of time is not limited 10 minutes and may be longer or shorter than 10 minutes.

According to the first exemplary embodiment, if the predetermined number of restore operations are performed, the CPU 31 varies a time interval to the next restore operation depending on the number of restore operations performed. For example, a time interval between the first restore operation and the second restore operation may be set to 15 minutes and a time interval between the second restore operation and third interval may be set to 30 minutes. The examination performed by the inventor has confirmed a case that the communication function that is not restored with the constant time interval set between the restore operations is restored with the time interval varied between the restore operations. According to the first exemplary embodiment, the possibility of the restoration of the communication function of the work booth 20 may be increased in comparison with when the restore operation is repeated with the constant time intervals. The time interval to the next restore operation may be gradually lengthened. Alternatively, the time interval to the next restore operation may be gradually shortened. For example, the time interval between the first restore operation and second restore operation may be set to 30 minutes and the time interval between the second restore operation and the third interval may be set to 15 minutes.

After the communication function of the work booth 20 is restored in the first exemplary embodiment, the CPU 31 transmits to the management server 40 the number of restore operations performed and/or the time length of the fault in the communication function. According to the first exemplary embodiment, for example, the CPU 31 transmits to the management server 40 both the number of restore operations performed and the time length of the fault in the communication function. In this way, both the number of restore operations performed and the time length of the fault in the communication function may be used in fault analysis. The CPU 31 causes the storage 36 to store the number of performed restore operations and the time length of the fault in the communication function during a period of time until the communication function of the work booth 20 is restored.

According to the first exemplary embodiment, the CPU 31 performs as the restore operations the first restore operation and second restore operation. Specifically, the CPU 31 performs the second restore operation if the communication function of the work booth 20 is not restored with the first restore operation performed. The possibility of the restoration of the communication function may be increased in comparison with when the restore operation of the work booth 20 is only one type. Since the activation of the communication unit 50 is being performed in the first restore operation, communication with the management server 40 is disabled during the first restore operation. The entire system of the work booth 20 is not closed. The first restore operation is thus different from the second restore operation in that the operation of the lights and electronic lock is not suspended in the first restore operation. According to the first exemplary embodiment, influence of the reservation operation on the user may be reduced in comparison with when the second restore operation is performed prior to the first restore operation.

If the CPU 31 determines in the first exemplary embodiment that the communication function of the work booth 20 has a fault, Bluetooth (registered trademark) as the predetermined connection method is tried to connect to the user terminal 60 of the user who has reserved the work booth 20. If the connection with the user terminal 60 is successfully established, the CPU 31 receives control over the various devices 39 from the user terminal 60. In this way, the user may unlock the door 21 by transmitting an unlock instruction to the work booth 20 with the user terminal 60 or may switch on the air-conditioner 26 with the user terminal 60. When the communication function of the work booth 20 is determined to be in fault, influence on the user may be reduced in comparison with when the connection with the user terminal 60 is inhibited.

The user terminal 60 connected to the work booth 20 via Bluetooth may be authorized to perform the restore operation. In such a case, the CPU 31 receives an execution instruction of the restore operation from the user terminal 60.

Second Exemplary Embodiment

Second exemplary embodiment is described below with the discussion of a common portion thereof with the first exemplary embodiment omitted herein.

Figure 14:
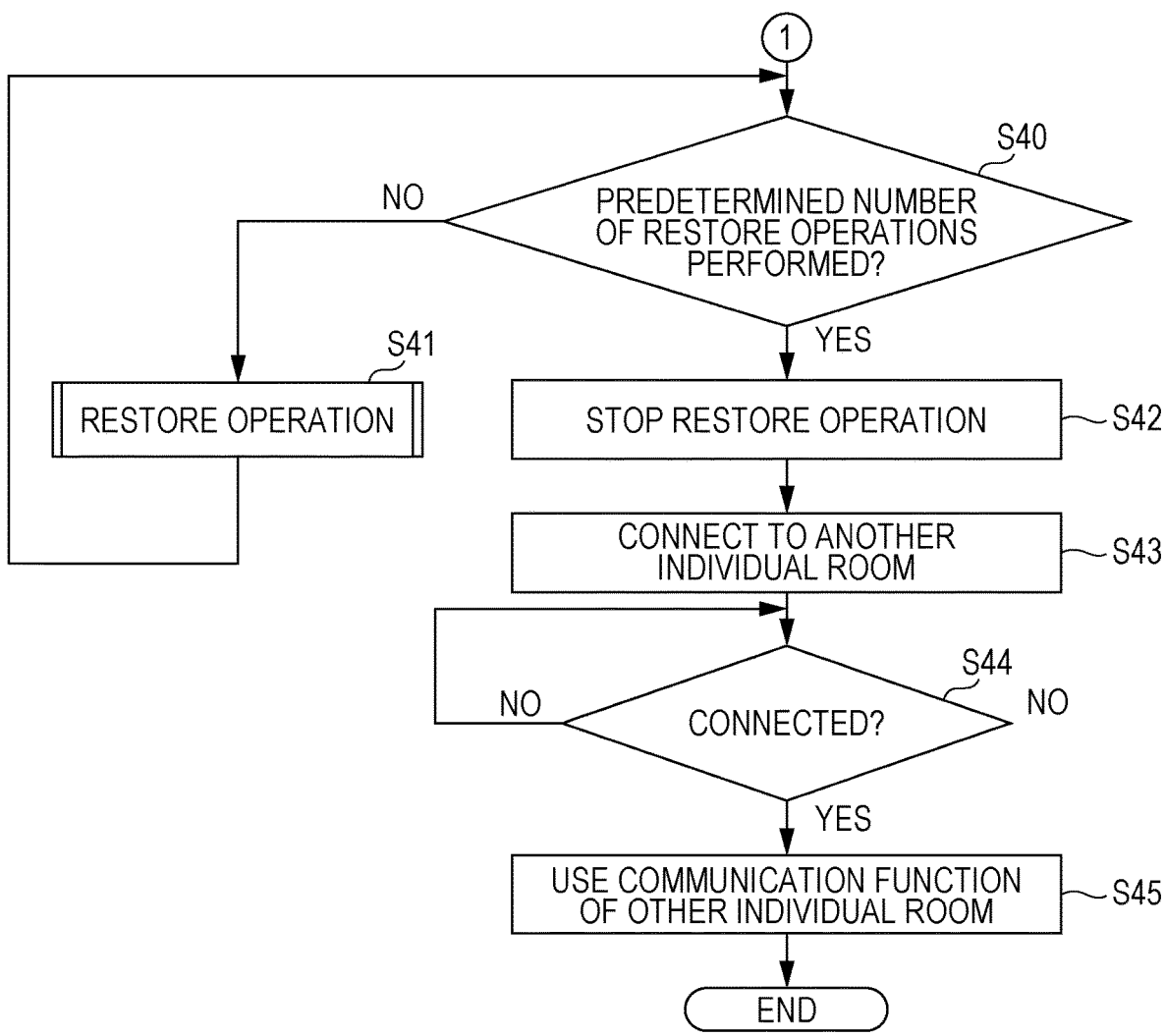
FIG. 14 is a third flowchart illustrating a flow of the control process of the controller in the work booth.

According to the second exemplary embodiment, if the CPU 31 does not determine in step S16 in FIG. 11 that the communication function of the work booth 20 is not restored (no path in step S16), the control process proceeds to step S40 in FIG. 14.

FIG. 14 illustrates a third flowchart illustrating the flow of the control process. The CPU 31 determines in step S40 in FIG. 14 whether the predetermined number of restore operations have been performed. If the CPU 31 determines in step S40 in FIG. 14 that the predetermined number of restore operations have been performed (yes path in step S40), the control process proceeds to step S42. On the other hand, if the CPU 31 does not determine that the predetermined number of restore operations have been performed (no path in step S40), the control process proceeds to step S41.

In step S41, the CPU 31 performs the restore operation on the work booth 20 and then returns to step S40. The subroutine in step S41 is identical to the subroutine in FIG. 13 described with reference to the first exemplary embodiment and the discussion thereof is thus omitted herein.

In step S42, the CPU 31 stops the restore operation and proceeds to step S43.

In step S43, the CPU 31 tries connecting to another work booth 20 different from the work booth 20 via the predetermined connection method. The CPU 31 proceeds to step S44. According to the second exemplary embodiment, the work booth 20 having a fault in the communication function is referred to as an "individual room A," and the other work booth 20 is referred to as an "individual room B." According to the second exemplary embodiment, the individual room 20A is installed adjacently to the individual room 20B.

According to the second exemplary embodiment, the predetermined connection method is Bluetooth. However, the predetermined connection method is not limited to Bluetooth and may be any connection method, such as infrared communication, as long as the connection between the individual room 20A and the individual room 20B is possible. Specifically, in step S43, the CPU 31 transmits to the surroundings of the individual room 20A the connection information to communicate via Bluetooth.

In step S44, the CPU 31 determines whether the connection with the individual room 20A has been established via the predetermined connection method, specifically, via Bluetooth. If the CPU 31 determines that the communication has been established via Bluetooth (yes path in step S44), the control process proceeds to step S45. If the CPU 31 does not determine that the communication has been established via Bluetooth (no path in step S44), the CPU 31 waits on standby until the communication has been established via Bluetooth.

In step S45, the CPU 31 communicates with the management server 40 with the communication function of the individual room 20B. The control process thus ends.

According to the second exemplary embodiment, as described above, the CPU 31 may thus determine that the communication function of the individual room 20A has a fault. If the individual room 20B connectable via the predetermined connection method, such as Bluetooth, is present, the CPU 31 connects to the individual room 20B via Bluetooth. The CPU 31 then communicates with the management server 40 using the communication function of the connected individual room 20B. According to the second exemplary embodiment, when the CPU 31 determines that the communication function of the work booth 20A has the fault, influence on the user may be reduced in comparison with when the connection with the individual room 20B is inhibited.

Third Exemplary Embodiment

Third exemplary embodiment is described below with the discussion of a common portion thereof with the other exemplary embodiments omitted herein.

Figure 15:
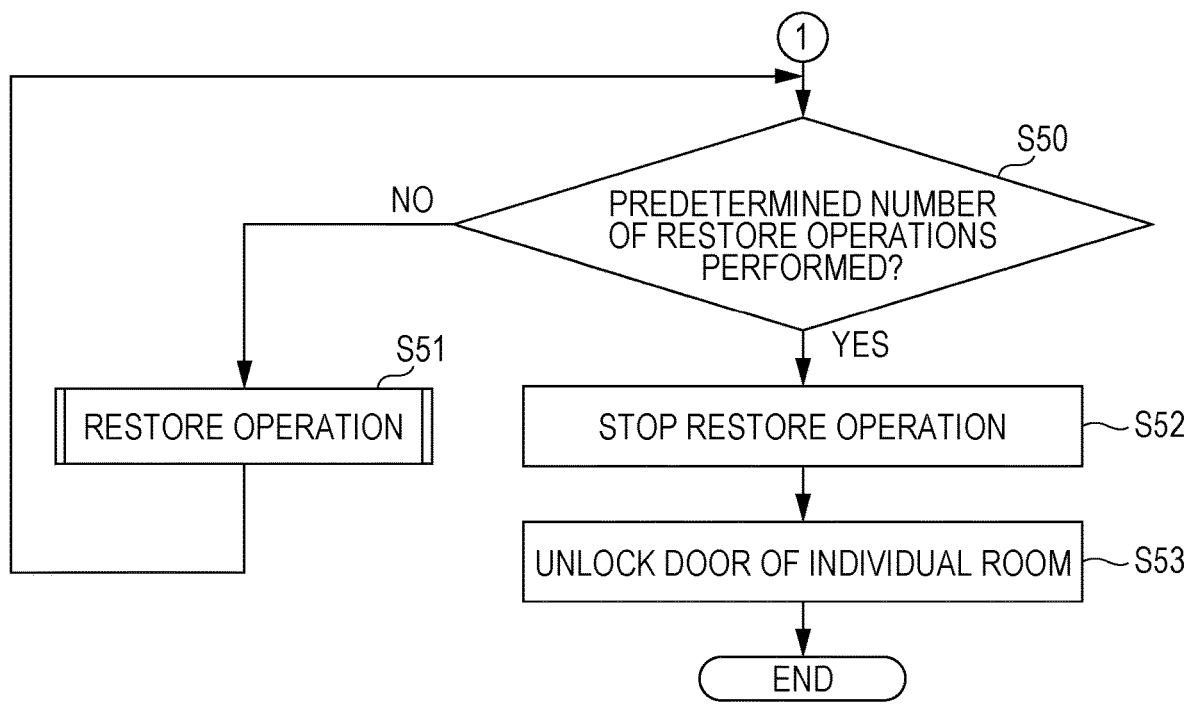
FIG. 15 is a fourth flowchart illustrating a flow of the control process of the controller in the work booth.

According to the third exemplary embodiment, if the CPU 31 determines in step S16 in FIG. 11 does not determine that the communication function of the work booth 20 is restored (no path in step S16), the control process proceeds to step S50 in FIG. 15.

FIG. 15 is a fourth flowchart of the flow of the control process. In step S50 in FIG. 15, the CPU 31 determines whether the predetermined number of restore operations have been performed. If the CPU 31 determines that the predetermined number of restore operations have been performed (yes path in step S50), the control process proceeds to step S52. On the other hand, if the CPU 31 does not determine that the predetermined number of restore operations have been performed (no path in step S50), the control process proceeds to step S51.

In step S51, the CPU 31 performs the restore operation on the work booth 20 and then returns to step S50. The subroutine in step S51 is identical to the subroutine of the first exemplary embodiment in FIG. 13 and the discussion thereof is omitted herein.

In step S52, the CPU 31 stops the restore operation and then proceeds to step S53.

In step S53, the CPU 31 unlocks the door 21 of the work booth 20. The control process thus ends.

According to the third exemplary embodiment, if the CPU 31 determines that the communication function of the work booth 20 has a fault, the door 21 is unlocked without an unlock operation to unlock the door 21 of the work booth 20. The unlock operation includes an unlock instruction from the management server 40 and an operation of a door switch as one of the various switches 38 installed within the work booth 20. Even when the communication function of the work booth 20 has the fault, influence on the user may be reduced in comparison with when the door 21 of the work booth 20 is unlocked in response to the unlock operation.

According to the third exemplary embodiment, when the communication function of the work booth 20 is restored, the CPU 31 locks the door 21 of the work booth 20 and shifts locking control to automatic door lock.

Fourth Exemplary Embodiment

Fourth exemplary embodiment is described below with the discussion of a common portion with the other exemplary embodiments omitted herein.

According to the fourth exemplary embodiment, if an image captured by the camera 27 in the work booth 20 has a problem, the CPU 31 determines that the communication function of the work booth 20 has a fault and then performs the restore operation. The camera 27 is an example of an "imager." According to the fourth exemplary embodiment, the CPU 31 periodically transmits to the management server 40 the image captured by the camera 27.

For example, the image captured by the camera 27 in the work booth 20 having the problem signifies that the image has nothing or that a portion of the image is missing. According to the fourth exemplary embodiment, the CPU 41 in the management server 40 having acquired the image captured by the camera 27 performs image analysis on the image, thereby determining whether the image has any problem. If the CPU 41 determines that the image has a problem, the CPU 41 transmits to the work booth 20 having the camera 27 information indicating that the image has the problem. In response to the problem in the image captured by the camera 27, the CPU 31 in the controller 30 in the work booth 20 having received the information determines that the communication function of the work booth 20 has a fault and then performs the restore operation.

According to the fourth exemplary embodiment thus configured, if the CPU 41 determines that the problem, different from the fault in the communication function of the work booth 20, occurs in the image, an operation to restore the communication function, namely, the restore operation may be started without manual intervention.

According to the fourth exemplary embodiment, if the problem remains in the image captured by the camera 27 after the restore operation, the CPU 31 may determine that there is another problem and transmit, to the terminal of the administrator maintaining the work booth 20, information indicating that the camera 27 is faulty.

Fifth Exemplary Embodiment

Fifth exemplary embodiment is described below with the discussion of a common portion with the other exemplary embodiments omitted herein.

According to the fifth exemplary embodiment, in response to a predetermined trigger, the CPU 31 in the controller 30 in the work booth 20 transmits to the management server 40 device information related to the various devices 39 in the work booth 20. In the fifth exemplary embodiment, the predetermined trigger is issued at five minute intervals. The time interval of the issuance of the predetermined trigger may also be longer or shorter than five minutes. For example, according to the fifth exemplary embodiment, the various devices 39 include the air-conditioner 26 and the device information may be detection information provided by an air-conditioner sensor in the various sensors 37 that detects on-off state of the air-conditioner 26. The various devices 39 may include not only the air-conditioner 26 but also other devices 39, such as the electronic lock and the camera 27. The various devices 39 may include other devices. The device information is not limited to the detection information provided by the air-conditioner sensor but may also be detection information of a magnetic sensor and information on the image captured by the camera 27. The device information may also be information on the various devices 39.

According to the fifth exemplary embodiment, if the device information has not been received from the CPU 31 for a predetermined period of time, the CPU 41 in the management server 40 transmits, to the user terminal 60 having reserved the work booth 20, information (hereinafter referred to as fault information) indicating that the communication function of the work booth 20 has a fault. For example, the predetermined period of time is 10 minutes. The predetermined period of time is not limited to 10 minutes and may be longer or shorter than 10 minutes.

Figure 16:
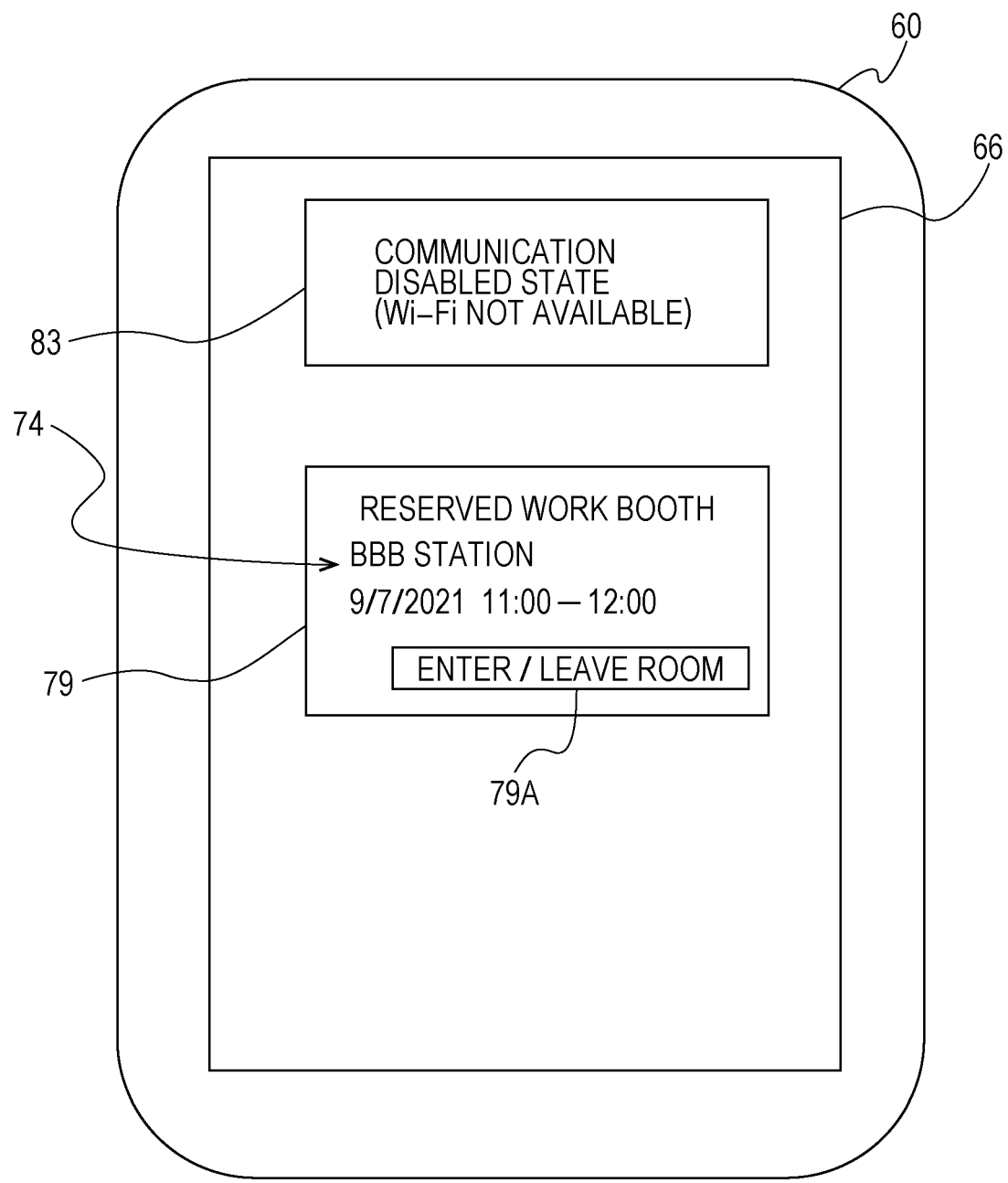
FIG. 16 illustrates a first display example of a display of the user terminal having received fault information.

FIG. 16 illustrates a first display example of the display 66 in the user terminal 60 having received the fault information. The CPU 41 causes the web site to display the first display example in FIG. 16 on a top screen immediately after the user logs in on the web site.

The display 66 in FIG. 16 displays work booth information 79 and message information 83 indicating a message corresponding to the received fault information. Referring to FIG. 16, for example, the message information 83 is "Communication disabled state (Wi-Fi not available)." The message displayed as the message information 83 is not limited to the message described above.

Figure 17:
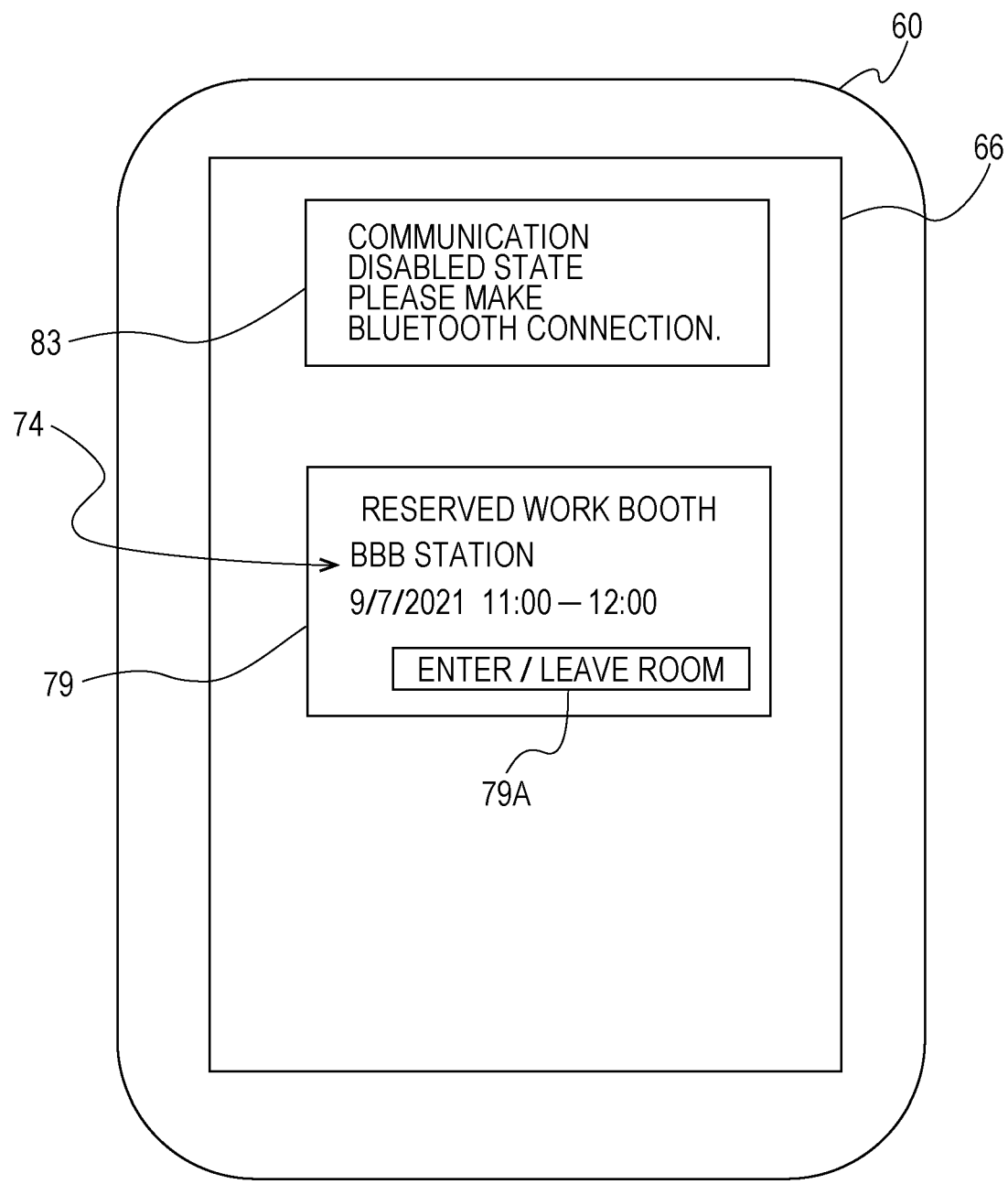
FIG. 17 illustrates a second display example of the display of the user terminal having received the fault information.

FIG. 17 illustrates a second display example of the display 66 in the user terminal 60 having received the fault information. The CPU 41 causes the display 66 to display the second display example in FIG. 17 in place of the first display example in FIG. 16 on the top screen immediately after the user logs in on the web site.

The display 66 in FIG. 17 displays the work booth information 79 and message information 83. For example, referring to FIG. 17, the message information 83 is "Communication disabled state Please make Bluetooth connection." In this way, the CPU 41 may display not only the occurrence of the fault in the communication function of the work booth 20 but also a solution to the fault. If the second display example in FIG. 17 is displayed, the user having viewed the user terminal 60 may be prompted to try the Bluetooth connection with the work booth 20.

If the message information 83 includes the solution to the fault in the communication function of the work booth 20 as illustrated in FIG. 17, solution information 84 (see FIG. 18) for the solution may be included in a reservation confirmation mail transmitted from the management server 40 to the user terminal 60 when the reservation of the work booth 20 is complete.

Figure 18:
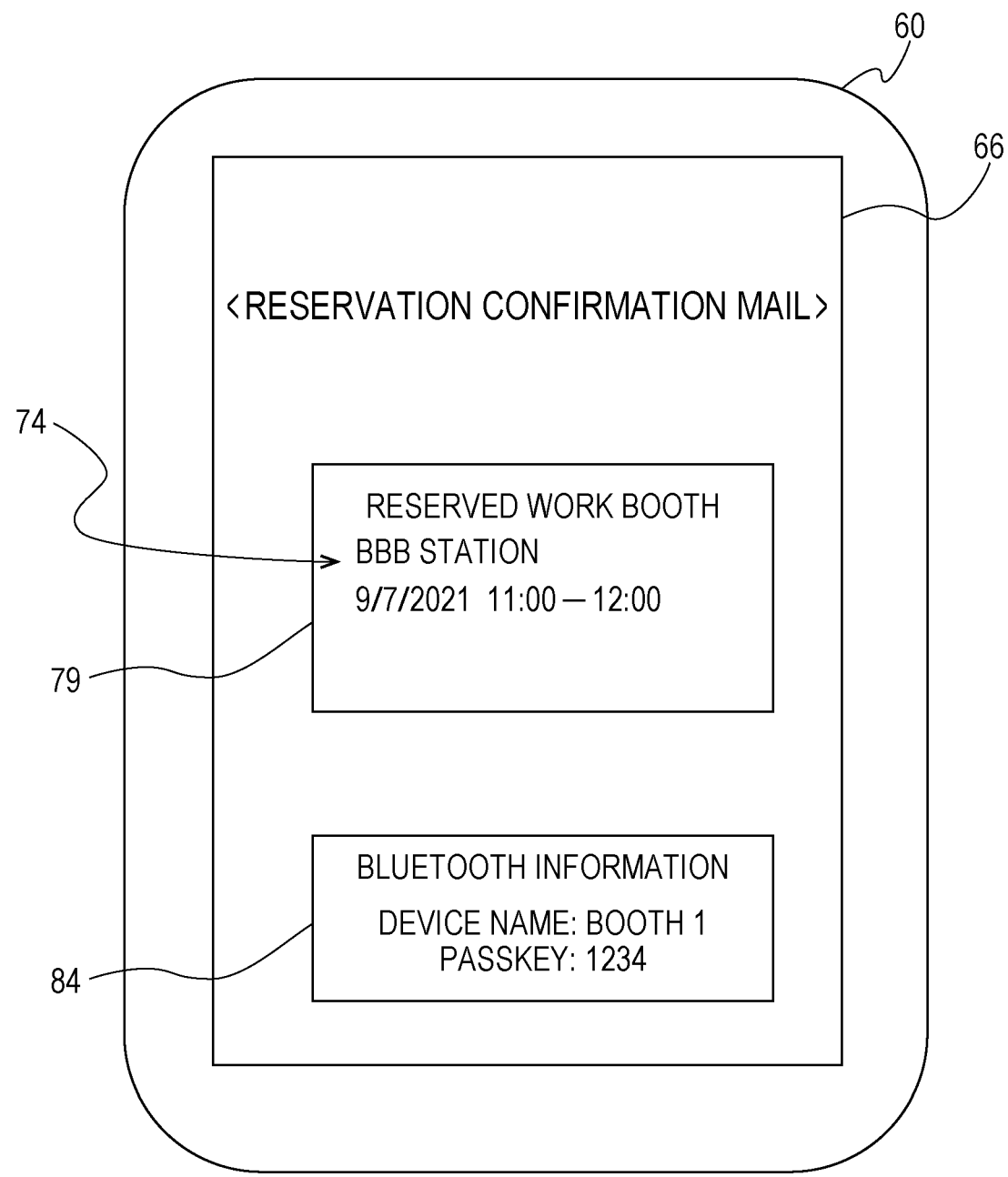
FIG. 18 illustrates a display example of a reservation confirmation mail displayed on the display of the user terminal.

FIG. 18 illustrates a display example of the reservation confirmation mail displayed on the display 66 in the user terminal 60. The display 66 in FIG. 18 displays the work booth information 79 and solution information 84. The work booth information 79 includes the message information 74 and, for example, displays "Reserved work booth BBB station 9/7/2021 11:00-12:00" as the message information 74.

For example, the solution information 84 is Bluetooth information used to Bluetooth-connect to the work booth 20. The Bluetooth information includes a device name and passkey. For example, as illustrated in FIG. 18, the device name is "Booth 1" and the passkey is "1234."

According to the fifth exemplary embodiment configured described above, if the management server 40 does not receive the device information from the work booth 20, the user may recognize that the communication function of the work booth 20 has a fault. If the device information has not been received for a predetermined period of time, the CPU 41 in the management server 40 may transmit the fault information to the terminal of the administrator maintaining the work booth 20 in place of or in addition to transmitting the fault information to the user terminal 60.

According to the fifth exemplary embodiment, the CPU 41 may not only transmit the fault information as content to be displayed on the top screen of the web site to the user terminal 60 but also transmit the fault information via a chat function, such as social networking service (SNS), to the user terminal 60 and/or the terminal of the administrator.

According to the fifth exemplary embodiment, if the device information has not been received for a predetermined period of time with another reservable work booth 20 present, the CPU 41 in the management server 40 may transmit, to the user terminal 60 of the user who has reserved the work booth 20 having a fault in the communication function, change information that recommends the user to change to the other work booth 20.

Figure 19:
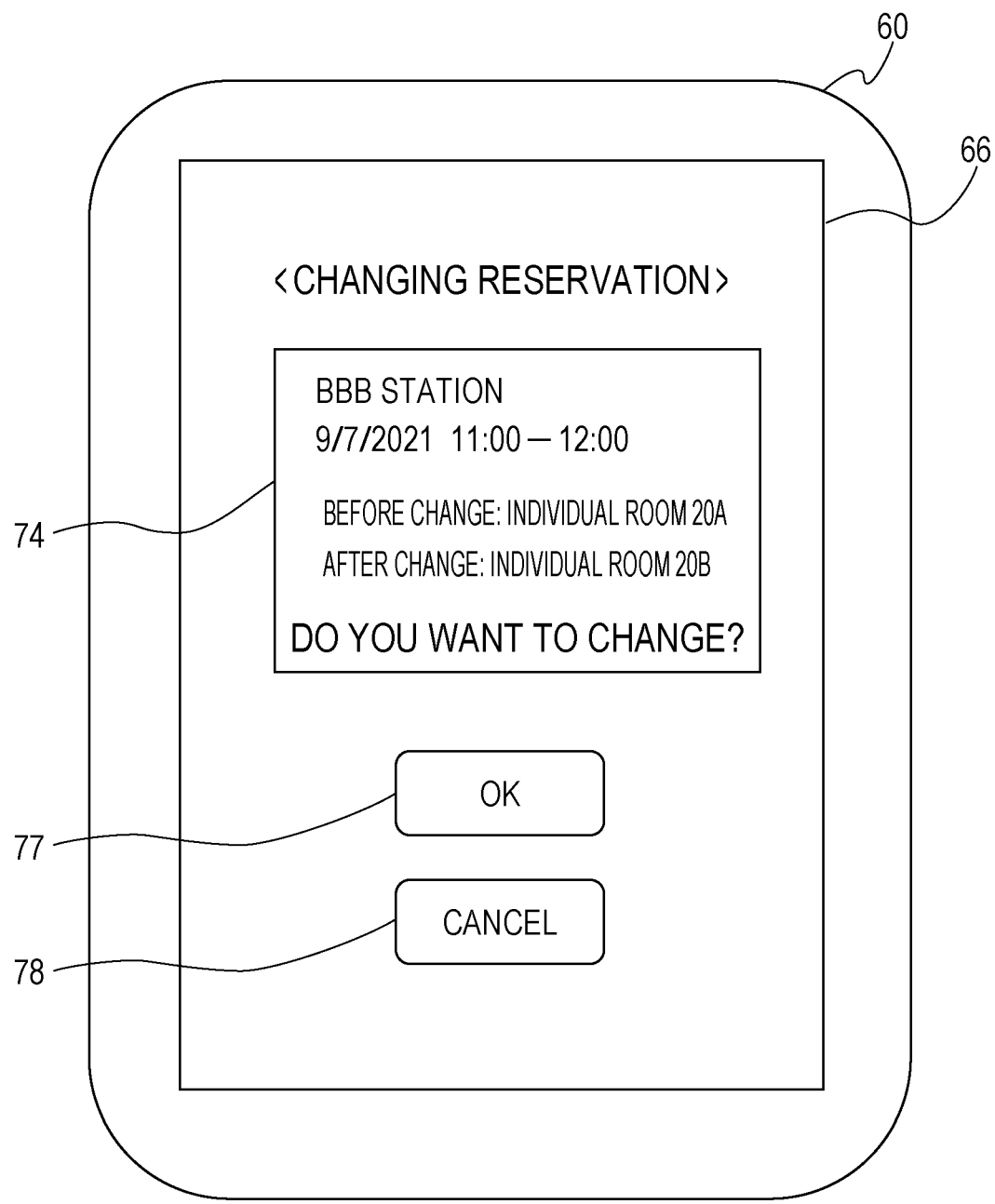
FIG. 19 illustrates a display example of change information displayed on the display of the user terminal.

FIG. 19 illustrates a display example of the change information displayed on the display 66 in the user terminal 60.

The display 66 in FIG. 19 displays the message information 74, OK button 77, and cancel button 78. For example, referring to FIG. 19, the message information 74 is "BBB station 9/7/2021 11:00-21:00 Before change: individual room A After change: individual room B Do you want to change?" If the OK button 77 is operated in the contents of the message information 74 in FIG. 19, the CPU 41 changes the reservation of the work booth 20 to the contents of the message information 74 in FIG. 19. On the other hand, if the cancel button 78 is operated by the user with the display example in FIG. 19 displayed, the CPU 41 changes the contents displayed on the display 66 to predetermined contents without changing the reservation of the work booth 20.

Other Exemplary Embodiments

In the exemplary embodiments described above, the work booth 20 as an example of the facility is not limited to an individual room arranged near the station. For example, the work booth 20 may be a room in a warehouse, building or hotel or an individual room in a vehicle. The work booth 20 may not necessarily be a completely closed space. For example, the work booth 20 may be partly open to the outside with part of the ceiling thereof or part of the side wall thereof cut away. The work booth 20 may be partly open to the outside with the door 21 or the side wall of the work booth 20 not engaged with the ceiling or the floor of the work booth 20. The work booth 20 may be partly open to the outside with the door 21 or the side wall of the work booth 20 not engaged with the ceiling or the floor of an installation location where the work booth 20 is installed.

According to the exemplary embodiments described above, the individual rooms forming the work booth 20 are the individual rooms 20A and 20B. The number of individual rooms forming the work booth 20 is not limited to two and may be three or more. The configurations of the rooms forming the work booth 20 may be the same or different.

According to the exemplary embodiments described above, the door 21 of the work booth 20 is equipped with the electronic lock. Alternatively, a cylinder lock or a thumb turn lock may be used on the door 21.

According to the exemplary embodiments described above, the reservation information is periodically transmitted from the management server 40 to the work booth 20. Alternatively, if a predetermined event has occurred, the reservation information may be transmitted each time when the predetermined event occurs. The predetermined event may be a new reservation performed on the work booth 20, the end of the use of the work booth 20 within the usage time, or the cancellation of the reservation of the work booth 20. Even when the predetermined event occurs, the reservation information may be transmitted at the same timing as the periodic transmission of the reservation information. The reservation information transmitted from the management server 40 to the work booth 20 may be the reservation information on the day or the reservation information on several days.

According to the exemplary embodiments described above, the controller 30 in the work booth 20 may continue to operate or may stop operating outside the usage time of the work booth 20.

According to the exemplary embodiments described above, the restore operation is not performed outside the usage time of the work booth 20. Alternatively, even outside the usage time, the CPU 31 may perform the restore operation immediately before the usage time of the next day. The phrase "immediately before the usage time of the next day" may be appropriately set, for example, to 1 hour, 30 minutes, or 10 minutes earlier than the start of the usage time.

According to the exemplary embodiments described above, the first restore operation includes controlling the power supplying to the power harness 29 and re-starting the router 50A. If the communication function of the work booth 20 is not restored even after the power supplying to the power harness 29 is controlled, the router 50A may be re-started. If the communication function of the work booth 20 is not restored even after the router 50A is re-started, the power supplying to the power harness 29 may be controlled. Alternatively, the first restore operation may include either controlling the power supplying to the power harness 29 or re-starting the router 50A.

According to the exemplary embodiments described above, the second restore operation is performed if the first restore operation fails to restore the communication function of the work booth 20. Alternatively, the second restore operation may be performed before the first restore operation.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to, if a facility that is to be reserved for use is determined to have a fault in a communication function in view of a communication status with outside, and if a user using the facility is determined to be absent, perform a restore operation on the facility to restore the communication function.

2. The information processing apparatus according to claim 1, wherein the processor is configured to perform the restore operation within a usage time while the facility is determined to be available to the user.

3. The information processing apparatus according to claim 2, wherein the processor is configured to perform the restore operation within a portion of the usage time that is determined to be a time band with the facility unreserved.

4. The information processing apparatus according to claim 3, wherein the processor is configured to stop the restore operation if the communication function is not restored by repeating the restore operation by a predetermined number of times and/or by continuing the restore operation for a predetermined period of time.

5. The information processing apparatus according to claim 2, wherein the processor is configured to stop the restore operation if the communication function is not restored by repeating the restore operation by a predetermined number of times and/or by continuing the restore operation for a predetermined period of time.

6. The information processing apparatus according to claim 1, wherein the processor is configured to stop the restore operation if the communication function is not restored by repeating the restore operation by a predetermined number of times and/or by continuing the restore operation for a predetermined period of time.

7. The information processing apparatus according to claim 6, wherein the processor is configured to, if the restore operation is repeated until the predetermined number of times, vary a time interval prior to a next restore operation in view of a number of repetitions of the performed restore operation.

8. The information processing apparatus according to claim 7, wherein the processor is configured to, after the communication function is restored, transmit to the outside the number of repetitions of the performed restore operation and/or a period of time of the fault of the communication function.

9. The information processing apparatus according to claim 1, wherein the processor is configured to perform, as the restore operation, a first restore operation that tries restoring the communication function by activating a communication device connected to the information processing apparatus and/or a second restore operation that tries restoring the communication function by re-starting an operating system of the information processing apparatus.

10. The information processing apparatus according to claim 9, wherein the processor is configured to perform the second restore operation if the communication function is not restored by performing the first restore operation.

11. The information processing apparatus according to claim 1, wherein the processor is configured to:
   if the communication function is determined to have the fault, try connecting to a terminal of a user that has reserved the facility via a predetermined connection method; and if connection with the terminal of the user has been established, receive, from the terminal of the user, control that is performed on a device included in the facility.

12. The information processing apparatus according to claim 1, wherein the processor is configured to:
   if the communication function is determined to have the fault, connect to a second facility via a predetermined connection method with the second facility connectable via the predetermined connection method being present; and
   communicate with the outside using a communication function of the second facility connected.

13. The information processing apparatus according to claim 1, wherein the processor is configured to, if the communication function is determined to have the fault, unlock a door of the facility without an unlocking operation to unlock the door.

14. The information processing apparatus according to claim 1, wherein the processor is configured to, if a problem has occurred in an image captured by an imager in the facility, perform the restore operation based on a premise that the communication function has had the fault.

15. An information processing system comprising:
   the information processing apparatus according to claim 1 including a first processor; and
   a server including a second processor and communicating with the information processing apparatus via a communication function of a facility including the information processing apparatus,
   wherein the first processor is configured to, in response to a predetermined trigger, transmit, to the server, device information on a device in the facility, and
   wherein the second processor is configured to, if the device information transmitted from the first processor is not acquired for a predetermined period of time, transmit information, indicating that the communication function has had the fault, to a terminal of a user having reserved the facility and/or a terminal of an administrator performing maintenance of the facility.

16. An information processing method comprising:
   if a facility that is to be reserved for use is determined to have a fault in a communication function in view of a communication status with outside, and if a user using the facility is determined to be absent, performing a restore operation on the facility to restore the communication function.

17. A non-transitory computer readable medium storing a program causing a computer to execute a process, the process comprising: if a facility that is to be reserved for use is determined to have a fault in a communication function in view of a communication status with outside, and if a user using the facility is determined to be absent, performing a restore operation on the facility to restore the communication function.

* * * * *